United States Patent
Tochibori

(10) Patent No.: US 10,124,475 B2
(45) Date of Patent: Nov. 13, 2018

(54) RETAINING-RING-ATTACHING TOOL AND SHAFT-MANUFACTURING METHOD

(71) Applicant: FUJI XEROX CO., LTD., Tokyo (JP)

(72) Inventor: Osamu Tochibori, Niigata (JP)

(73) Assignee: FUJI XEROX CO., LTD., Minato-ku, Tokyo (JP)

(*) Notice: Subject to any disclaimer, the term of this patent is extended or adjusted under 35 U.S.C. 154(b) by 264 days.

(21) Appl. No.: 15/134,487

(22) Filed: Apr. 21, 2016

(65) Prior Publication Data

US 2016/0361807 A1  Dec. 15, 2016

(30) Foreign Application Priority Data

Jun. 10, 2015 (JP) ................. 2015-117359
Aug. 21, 2015 (JP) ................. 2015-164065

(51) Int. Cl.
*B25B 27/20* (2006.01)
*F16B 21/18* (2006.01)

(52) U.S. Cl.
CPC ............ *B25B 27/20* (2013.01); *F16B 21/186* (2013.01)

(58) Field of Classification Search
CPC .......... B25B 27/20; B25B 27/30; B23P 11/00; B23P 19/048; B23P 19/084; B23P 19/088; Y10T 29/4987; Y10T 29/49872; Y10T 29/49876; Y10T 29/53487; Y10T 29/536;

(Continued)

(56) References Cited

U.S. PATENT DOCUMENTS 2,483,379 A * 9/1949 Brell .............. B25B 27/20
 221/220
2,870,529 A * 1/1959 Erdmann ........... B25B 27/20
 221/312 A (Continued)

FOREIGN PATENT DOCUMENTS

GB 879895 A * 10/1961 ............ B25B 27/20
JP 5733974 A 2/1982

(Continued)

OTHER PUBLICATIONS

Communication dated Aug. 23, 2017 from the State Intellectual Property Office of the P.R.C., in counterpart Chinese application No. 201610397941.2.

*Primary Examiner* — Matthew P Travers
(74) *Attorney, Agent, or Firm* — Sughrue Mion, PLLC

(57) ABSTRACT

A retaining-ring-attaching tool includes a holding portion having a notch in which a retaining ring is held; a body supporting the holding portion such that the holding portion is movable in one direction; a link mechanism including an operation portion supported by the body and being operable with a finger of a hand holding the body, the link mechanism being configured to move, when the operation portion is operated, the holding portion between a first position and a second position where the retaining ring held in the notch is ready to be attached to a shaft member, the link mechanism further including a force-applying portion applying an external force to the holding portion such that the holding portion moves to the second position; and a feeding portion supported by the body and, when the holding portion is moved to the first position, feeding the retaining ring to the notch.

3 Claims, 29 Drawing Sheets

(58) Field of Classification Search
CPC ........... Y10T 29/53613; Y10T 29/5363; Y10T 29/53909; F16B 21/18–21/186
See application file for complete search history.

(56) References Cited

U.S. PATENT DOCUMENTS

| | | | | |
|---|---|---|---|---|
| 2,978,802 A * | 4/1961 | Erdmann | ................ | B25B 27/20 29/229 |
| 2,991,546 A * | 7/1961 | Erdmann | ................ | B25B 27/20 29/229 |
| 3,040,419 A * | 6/1962 | Erdmann | ................ | B25B 27/20 29/229 |
| 3,173,197 A * | 3/1965 | Tuller | ..................... | B25B 27/20 29/229 |
| 3,478,405 A * | 11/1969 | Martin, Jr. | ............. | B25B 27/20 29/229 |
| 3,681,839 A * | 8/1972 | Janecka | ................. | B25B 27/20 29/229 |
| 3,846,900 A * | 11/1974 | Weglage | ................ | B21D 53/36 206/343 |
| 4,592,122 A * | 6/1986 | Sikula | ..................... | B25B 27/20 29/229 |
| 5,197,841 A * | 3/1993 | Tanaka | ..................... | B25B 27/20 411/353 |
| 6,125,517 A * | 10/2000 | Yu | ........................... | B25B 27/20 29/229 |
| 6,212,746 B1 * | 4/2001 | Cooks, Jr. | ............. | B23P 19/084 29/225 |

FOREIGN PATENT DOCUMENTS

| | | |
|---|---|---|
| JP | 5-228749 A | 9/1993 |
| JP | 11-028680 A | 2/1999 |

* cited by examiner

RETAINING-RING-ATTACHING TOOL AND SHAFT-MANUFACTURING METHOD

CROSS-REFERENCE TO RELATED APPLICATIONS

This application is based on and claims priority under 35 USC 119 from Japanese Patent Application No. 2015-117359 filed Jun. 10, 2015 and Japanese Patent Application No. 2015-164065 filed Aug. 21, 2015.

BACKGROUND

Technical Field

The present invention relates to a retaining-ring-attaching tool and a shaft-manufacturing method.

SUMMARY

According to an aspect of the invention, there is provided a retaining-ring-attaching tool including a holding portion having a notch in which a retaining ring is held; a body supporting the holding portion such that the holding portion is movable in one direction; a link mechanism including an operation portion supported by the body, the operation portion being operable with a finger of a hand holding the body, the link mechanism being configured to move, when the operation portion is operated, the holding portion between a first position and a second position, the retaining ring held in the notch being ready to be attached to a shaft member when the holding portion is at the second position, the link mechanism further including a force-applying portion applying an external force to the holding portion such that the holding portion moves to the second position; and a feeding portion supported by the body and, when the holding portion is moved to the first position, feeding the retaining ring to the notch.

BRIEF DESCRIPTION OF THE DRAWINGS

Exemplary embodiments of the present invention will be described in detail based on the following figures, wherein.

DETAILED DESCRIPTION

First Exemplary Embodiment

Referring to FIGS. 1 to 18, a retaining-ring-attaching tool and a shaft-manufacturing method according to a first exemplary embodiment of the present invention will now be described in that order. In each of the drawings, an arrow H represents the top-bottom direction (for example, a vertical direction), an arrow W represents the widthwise direction of the tool (for example, a horizontal direction), and an arrow T represents the front-rear direction of the tool (for example, another horizontal direction).

Retaining-Ring-Attaching Tool

Figure 11:
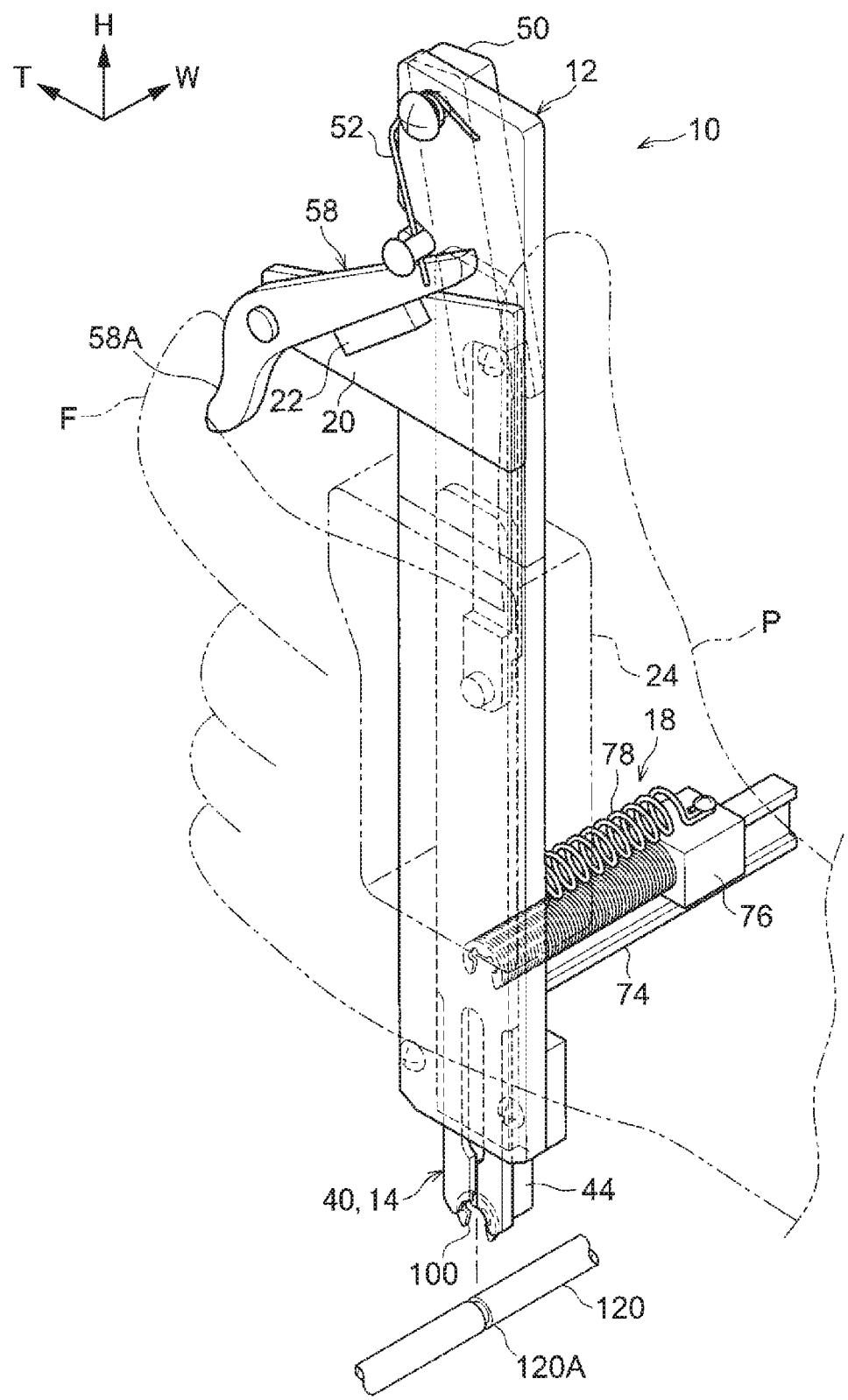
FIG. 11 is yet another perspective view of the retaining-ring-attaching tool according to the first exemplary embodiment of the present invention.
Figure 14:
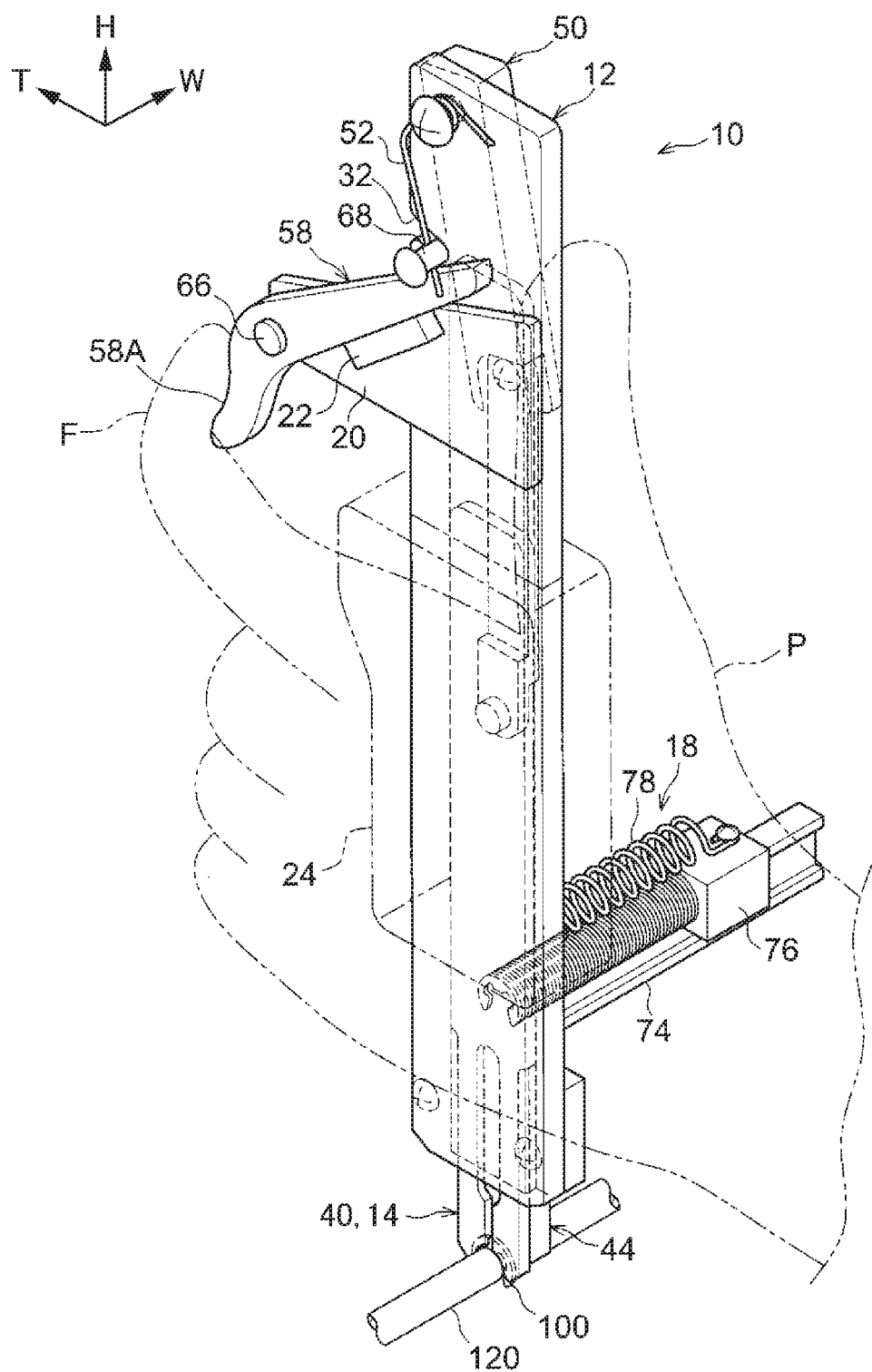
FIG. 14 is yet another perspective view of the retaining-ring-attaching tool according to the first exemplary embodiment of the present invention.
Figure 15:
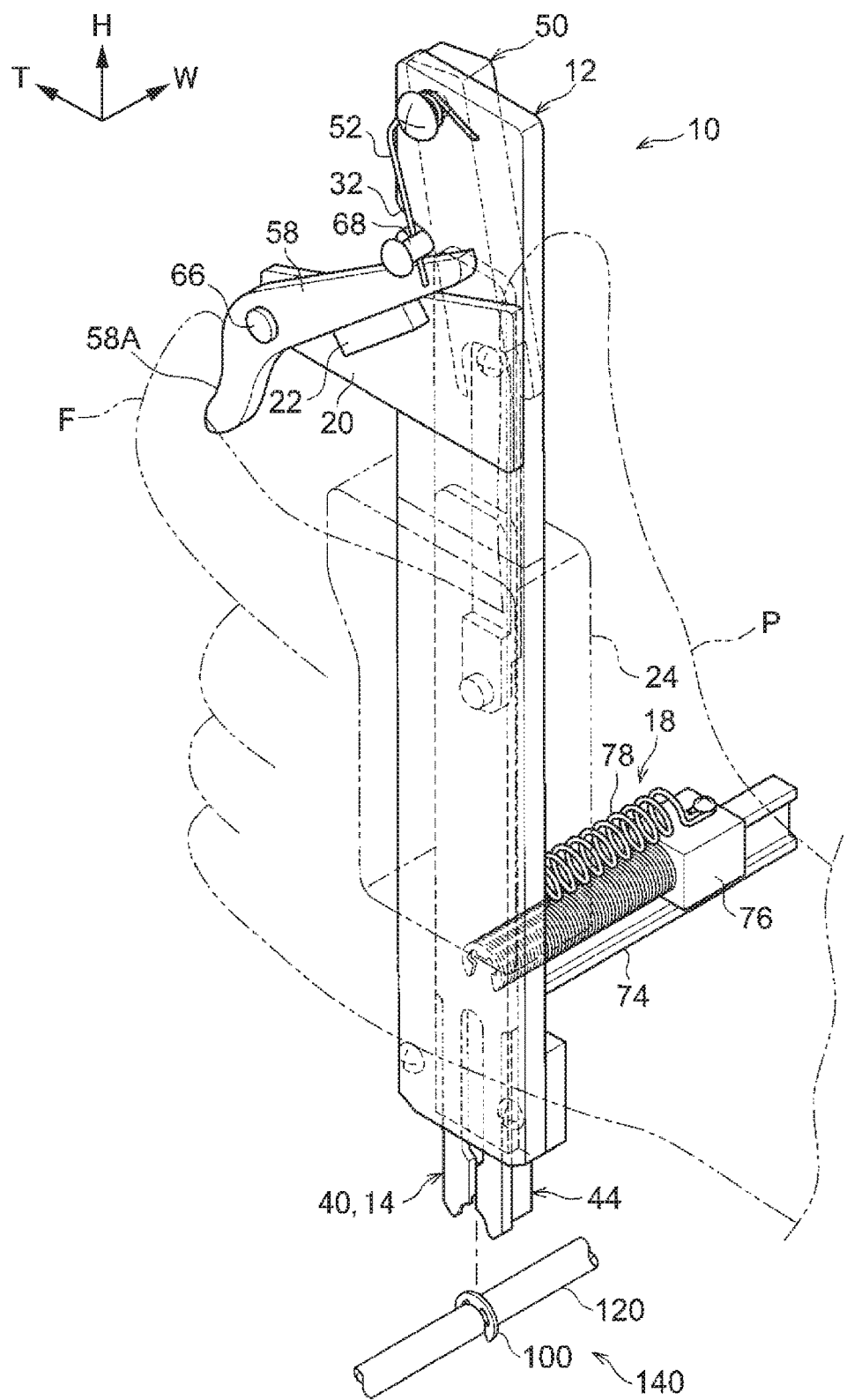
FIG. 15 is yet another perspective view of the retaining-ring-attaching tool according to the first exemplary embodiment of the present invention.
Figure 16:
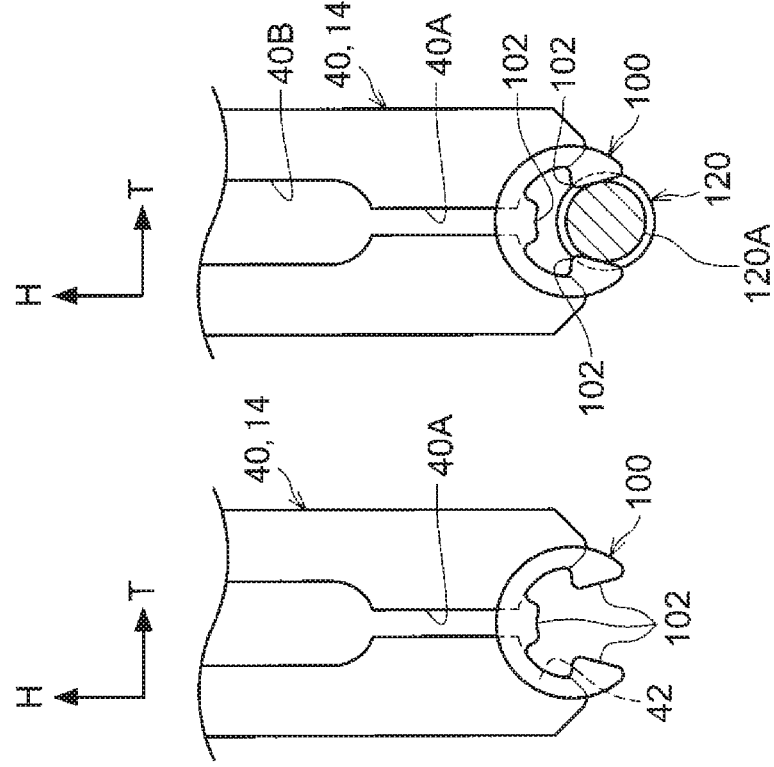
FIGS. 16A, 16B, 16C, and 16D are front views of a tip of a holding portion included in the retaining-ring-attaching tool according to the first exemplary embodiment of the present invention.
Figure 17:
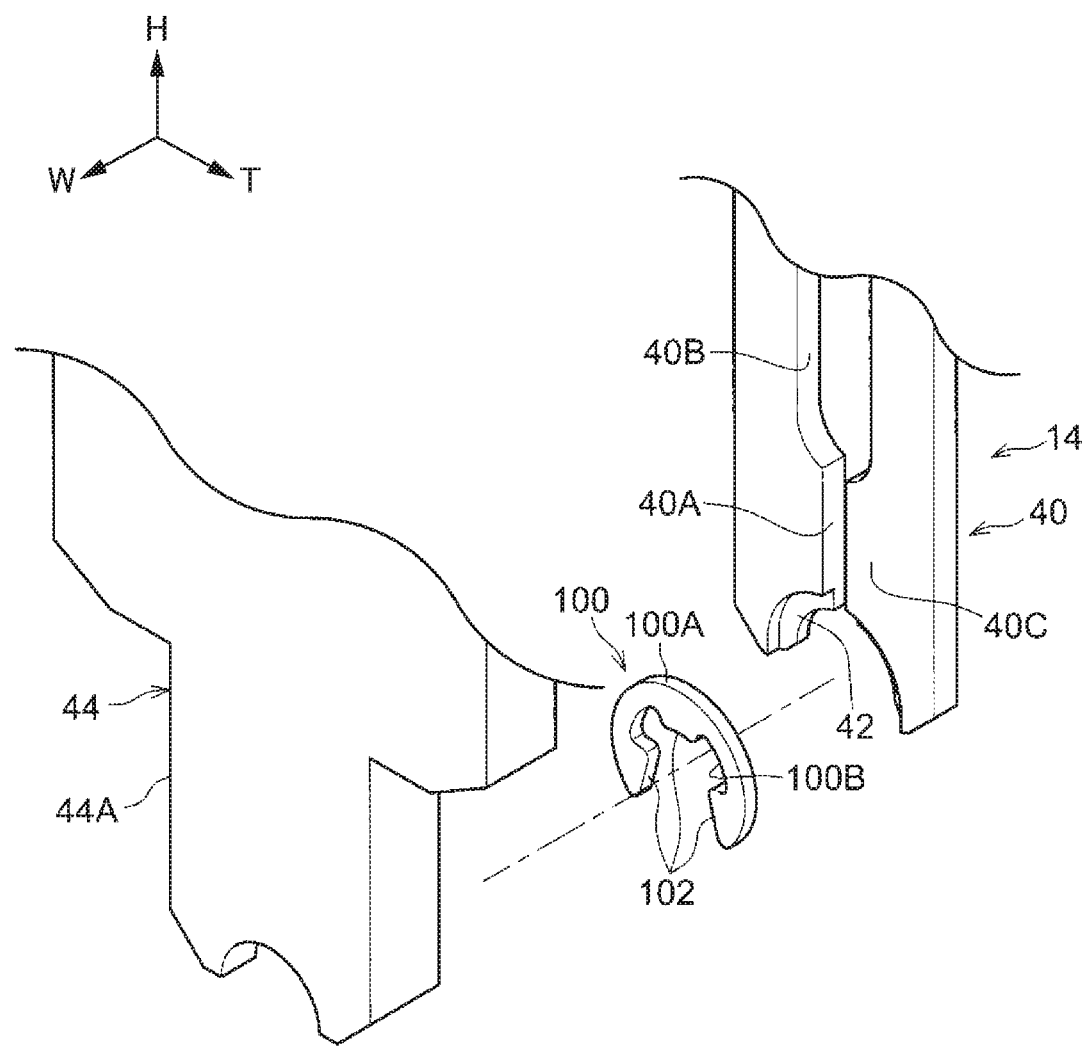
FIG. 17 is an exploded perspective view of the tip of the holding portion and other associated elements included in the retaining-ring-attaching tool according to the first exemplary embodiment of the present invention.

Referring to FIGS. 11, 14, and 15, a retaining-ring-attaching tool 10 (hereinafter referred to as "attaching tool 10") is a tool used in manufacturing a shaft 140 by attaching a retaining ring 100 to a groove 120A of a shaft member 120. The retaining ring 100 is a so-called E-ring (specified by a Japanese Industrial Standard JIS B 2805). As illustrated in FIG. 17, the retaining ring 100 has an arc-shaped outer peripheral edge 100A and an arc-shaped inner peripheral edge 100B, with three projections 102 projecting inward thereof from the inner peripheral edge 100B.

Figure 1:
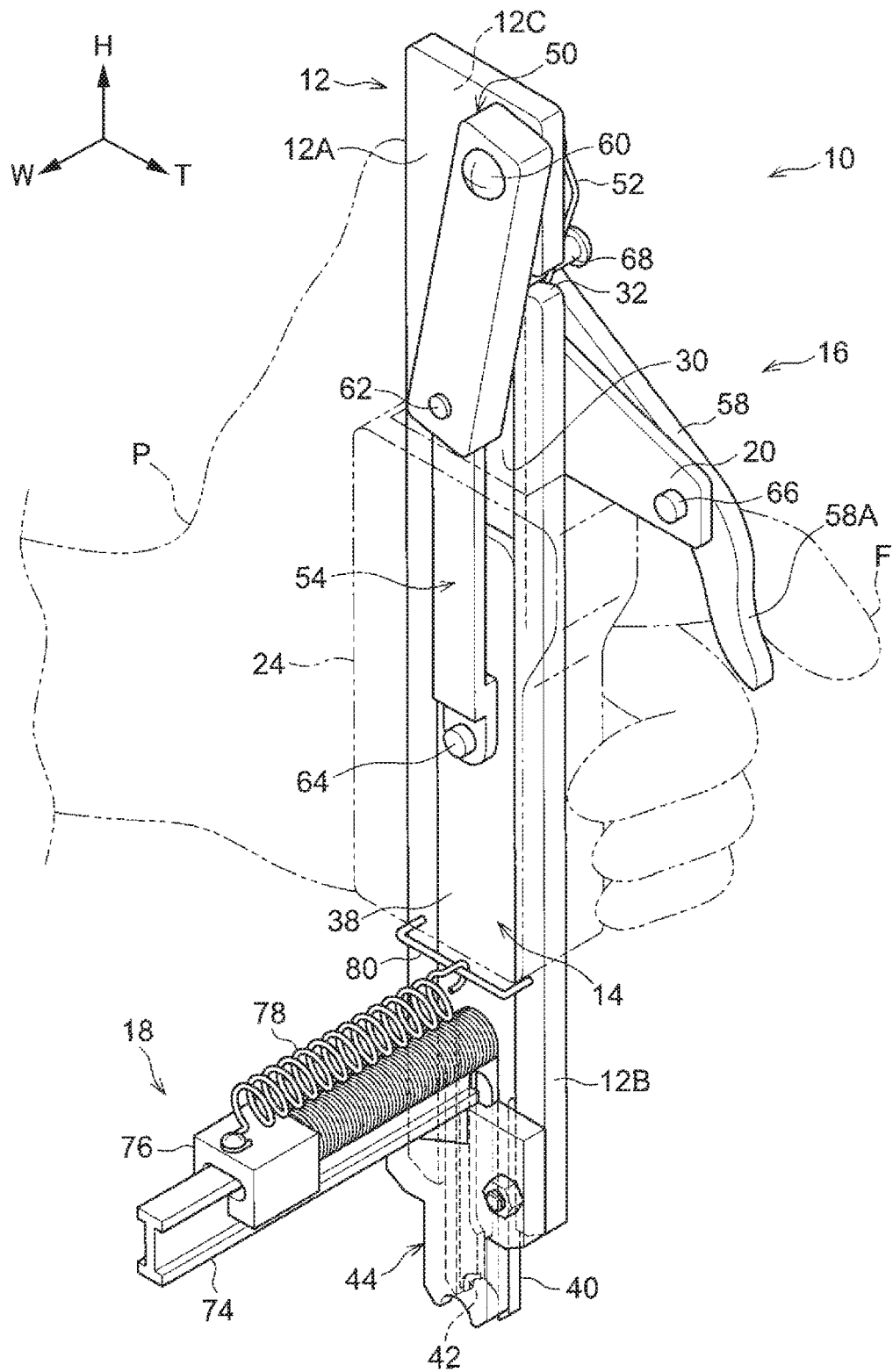
FIG. 1 is a perspective view of a retaining-ring-attaching tool according to a first exemplary embodiment of the present invention.
Figure 2:
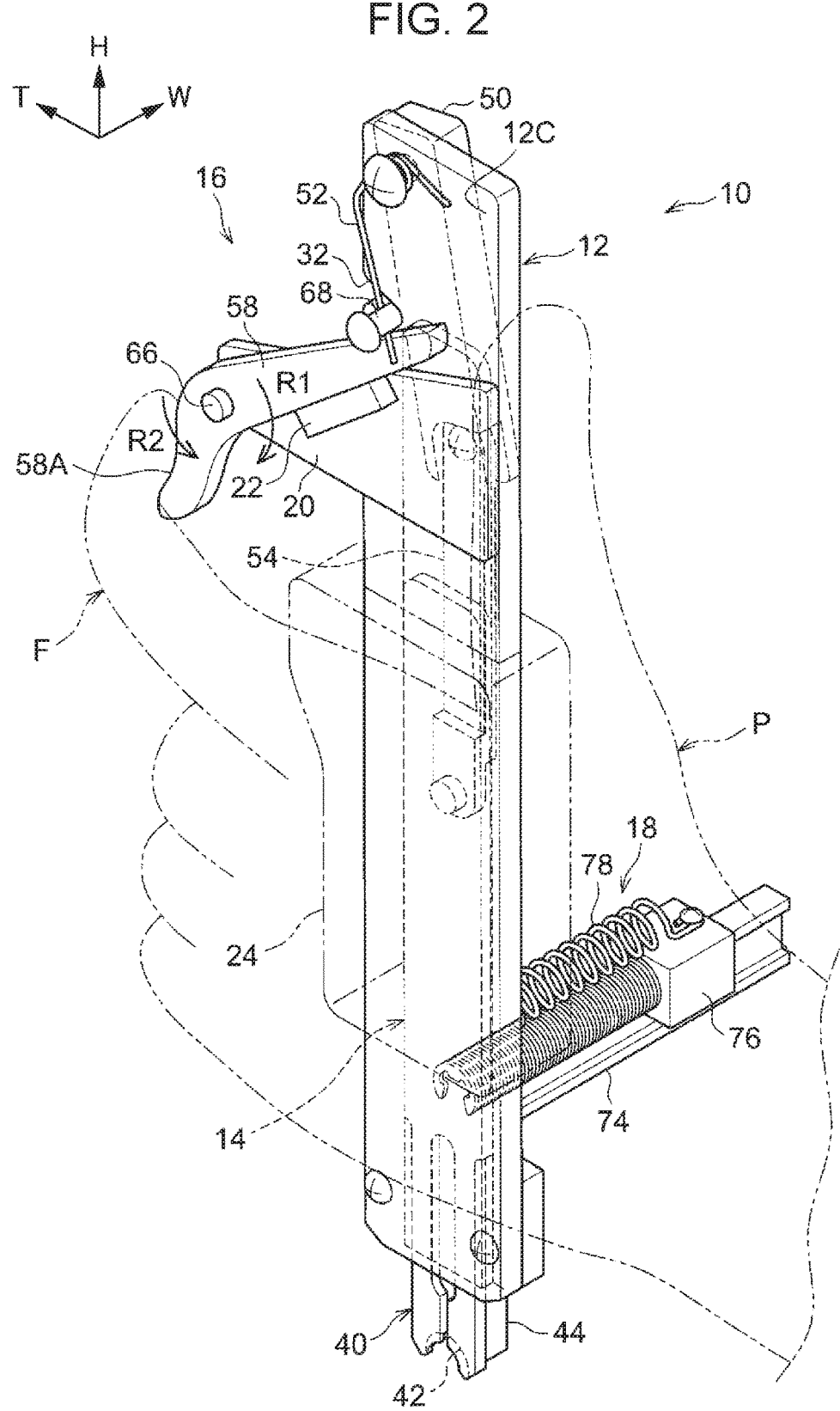
FIG. 2 is another perspective view of the retaining-ring-attaching tool according to the first exemplary embodiment of the present invention.
Figure 18:
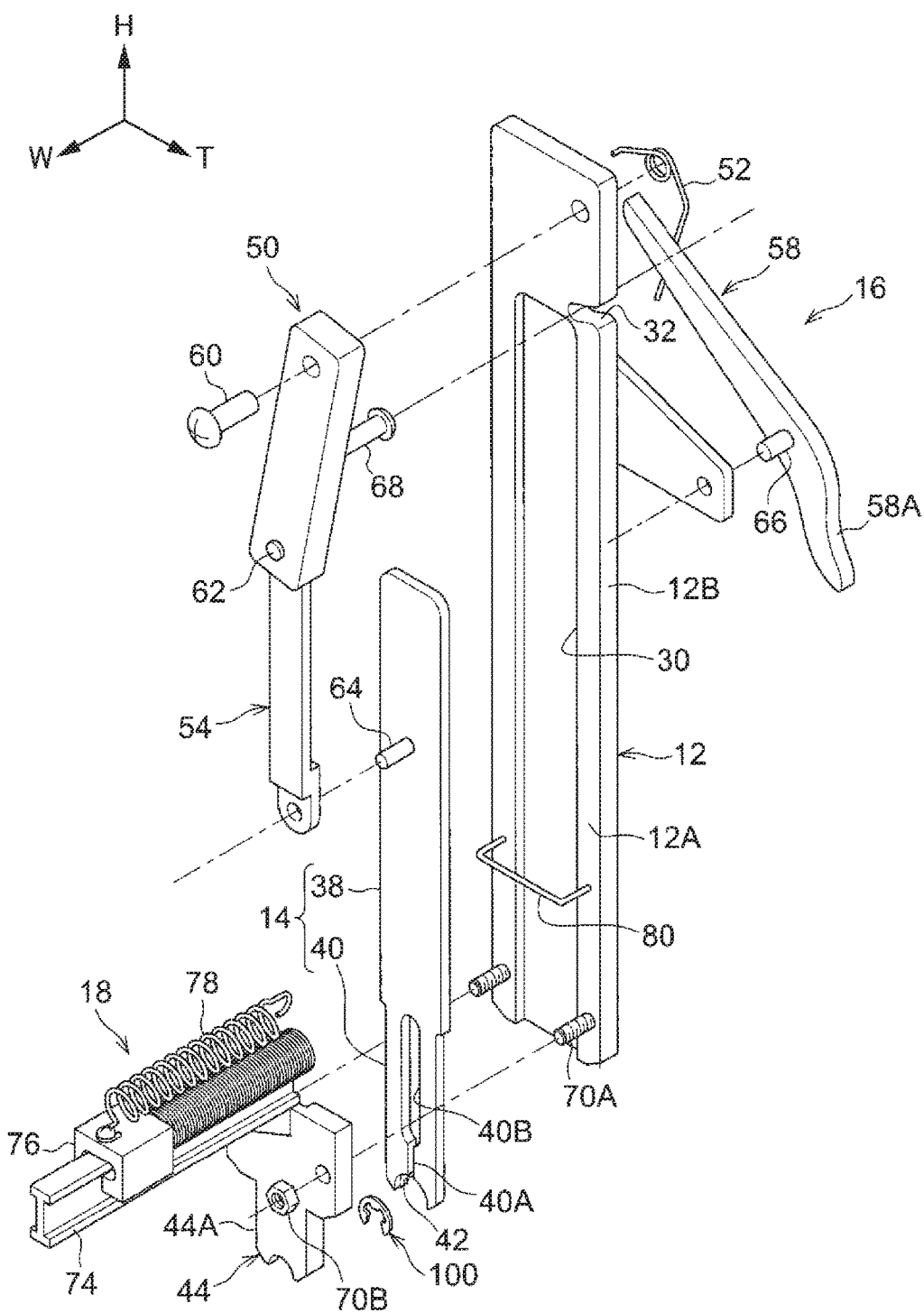
FIG. 18 is an exploded perspective view of the retaining-ring-attaching tool according to the first exemplary embodiment of the present invention.

Referring to FIGS. 1, 2, and 18, the attaching tool 10 includes a body 12, a holding portion 14 having a notch 42 in which the retaining ring 100 is held, a link mechanism 16 that moves the holding portion 14, a feeding portion 18 that feeds the retaining ring 100 to the notch 42, and a covering 44. A part of the retaining ring 100 fed to the notch 42 of the holding portion 14 is held between the holding portion 14 and the covering 44.

Body

The body 12 extends in the top-bottom direction and has a rectangular cross-sectional shape extending in the front-rear direction. Referring to FIG. 18, a side face 12A of the body 12 that faces toward a first side in the widthwise direction has a groove 30 having an open lower end and extending in the top-bottom direction. A front face 12B of the body 12 that faces toward the front side in the front-rear direction has a recess 32 provided in an upper part thereof and that is concave toward the rear side.

Referring to FIG. 2, a plate 20 is attached to a side face 12C of the body 12 that faces toward a second side in the widthwise direction. The plate 20 is attached, at a proximal-end portion thereof, to a position below the recess 32. The plate 20 projects frontward from the body 12. The plate 20 is provided with a stopper 22 that stops the rotation of a third link 58, which will be described later.

The body 12 is provided with a grip 24 that covers a central part thereof in the longitudinal (top-bottom) direction. The worker uses the attaching tool 10 by holding the grip 24 with a hand P. In other words, the worker holds the body 12 by the grip 24.

Holding Portion

Referring to FIGS. 1 and 18, the holding portion 14 extends in the top-bottom direction and is movable in the top-bottom direction within the groove 30 of the body 12. The holding portion 14 includes a base part 38 and a tip part 40. The base part 38 is fitted in the groove 30. The tip part 40 is continuous with the base part 38 and extends from the lower end of the base part 38.

The tip part 40 has a slit 40A that splits the tip part 40 in the front-rear direction. The slit 40A is open at the lower end and is continuous with an oblong hole 40B provided on the upper side of the slit 40A. The oblong hole 40B extends in the top-bottom direction.

Referring to FIG. 17, the tip part 40 has, at the lower end thereof, the notch 42 in which the retaining ring 100 is held. The notch 42 at the tip part 40 has an arc shape when seen in the widthwise direction. The notch 42 has a recess in a side face 40C facing toward the first side in the widthwise direction (i.e., facing toward the covering 44). The depth of the recess is the same as the thickness of the retaining ring 100. In a state where the retaining ring 100 is in the notch 42 as illustrated in FIG. 16A, the notch 42 has an arc-shaped edge beyond which two of the projections 102 of the retaining ring 100 project. When the retaining ring 100 is in the recess of the notch 42, the notch 42 pinches the retaining ring 100 in the front-rear direction so as to prevent the retaining ring 100 from dropping.

In the above configuration, the holding portion 14 is movable between a first position (see FIGS. 8 and 10) where the feeding portion 18 feeds a retaining ring 100 to the notch 42 and a second position (see FIGS. 3 and 13) where the retaining ring 100 held in the notch 42 is ready to be attached to the shaft member 120.

Link Mechanism

Referring to FIGS. 1, 2, and 18, the link mechanism 16 includes a first link 50 and a second link 54. A first end of the first link 50 is rotatably supported by the body 12. A first end of the second link 54 is rotatably supported by a second end of the first link 50. A second end of the second link 54 is rotatably supported by the holding portion 14. The link mechanism 16 further includes the third link 58. The third link 58 acts on (transmits a rotational force to) the first link 50 and thus rotates the first link 50 and the second link 54.

First Link

Figure 6:
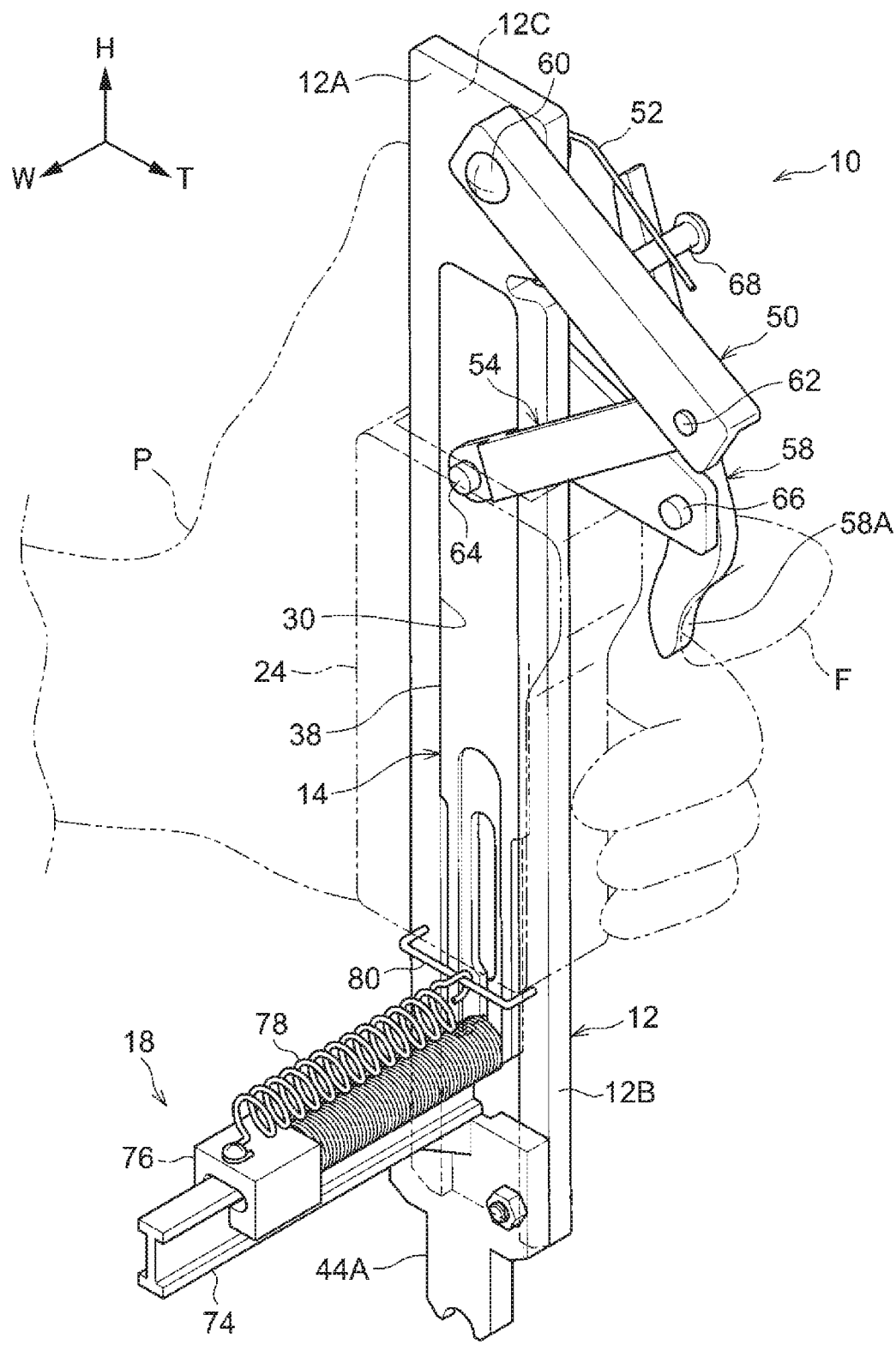
FIG. 6 is yet another perspective view of the retaining-ring-attaching tool according to the first exemplary embodiment of the present invention.

Referring to FIGS. 1 and 6, the first link 50 faces the side face 12A of the body 12. The first end of the first link 50 is rotatably supported at the upper end of the body 12 with the aid of a rod member 60 extending in the widthwise direction. The first link 50 is provided substantially at the longitudinal center thereof with a pin 68 projecting toward the body 12.

When the pin 68 is in contact with the peripheral wall of the recess 32, the holding portion 14 is at the second position (see FIG. 2), which will be described in detail later.

Second Link

Referring to FIGS. 1 and 6, the second link 54 faces the side face 12A of the body 12. The first end of the second link 54 is rotatably supported by the second end of the first link 50 with the aid of a rod member 62 extending in the widthwise direction. The second end of the second link 54 is rotatably supported by the base part 38 of the holding portion 14 with the aid of a rod member 64 extending in the widthwise direction.

Third Link

Figure 7:
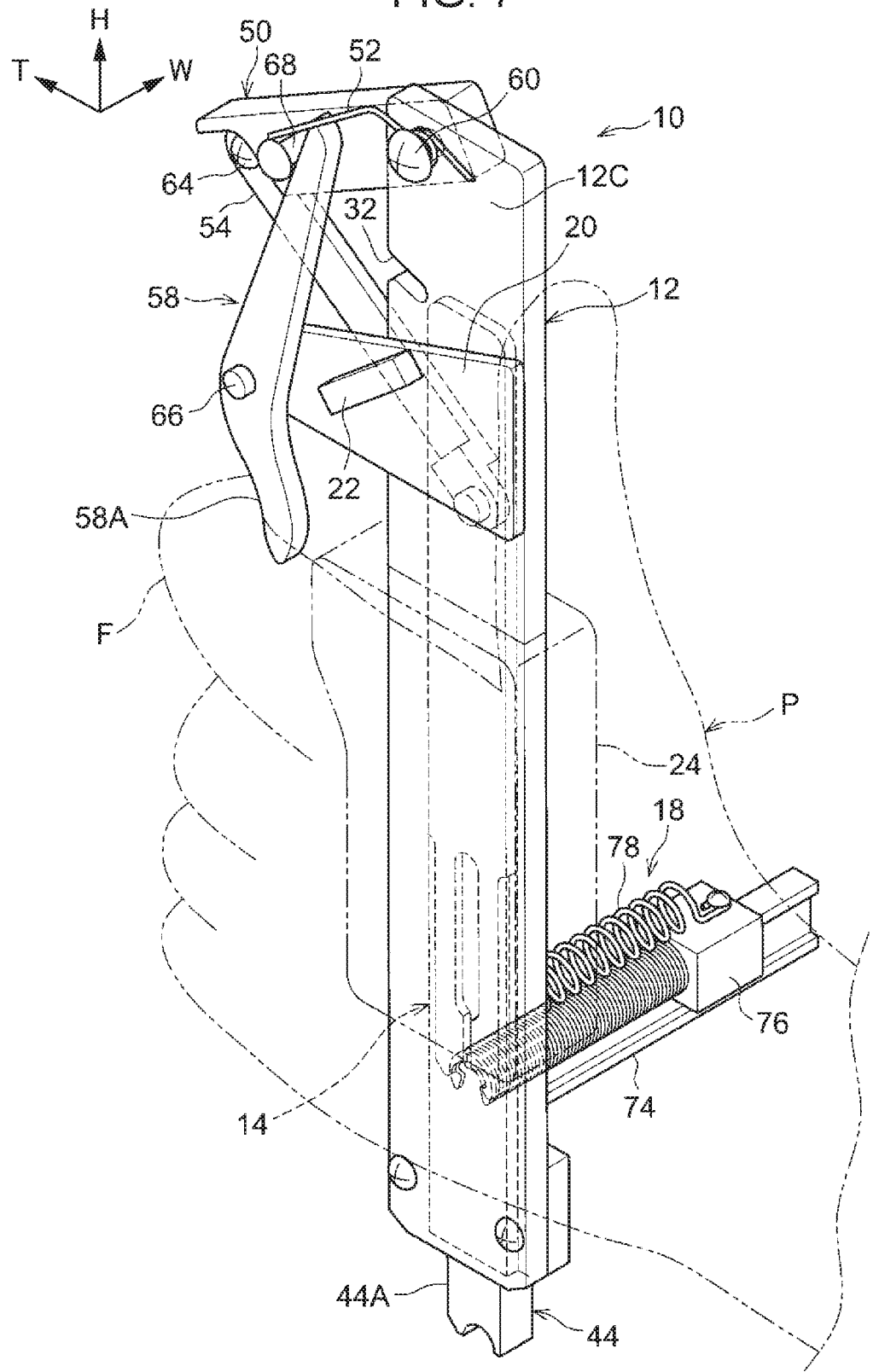
FIG. 7 is yet another perspective view of the retaining-ring-attaching tool according to the first exemplary embodiment of the present invention.

Referring to FIGS. 2 and 7, the third link 58 faces the side face 12C of the body 12 and is rotatably supported, at a position near the longitudinal center thereof, by the distal end of the plate 20 with the aid of a rod member 66 extending in the widthwise direction.

A portion of the third link 58 that is on a first side (on the left side in FIG. 2) with respect to the rod member 66 is an operation portion 58A. The operation portion 58A is operable with a finger F (the index finger) of the hand P holding the body 12.

The rotation of the third link 58 is stopped at the stopper 22. A portion of the third link 58 that is on a second side (on the right side in FIG. 2) with respect to the rod member 66 is in contact with the pin 68.

Torsion Spring

Referring to FIGS. 2 and 7, a torsion spring 52 as an exemplary force-applying portion is provided on the side face 12C of the body 12. The torsion spring 52 applies an external force (an elastic force) to the pin 68 and thus presses the pin 68 into the recess 32 and against the peripheral wall of the recess 32.

In the above configuration, the force exerted by the torsion spring 52 is transmitted through the pin 68 to the portion of the third link 58 that is on the second side with respect to the rod member 66, and the portion of the third link 58 that is on the second side is brought into contact with the stopper 22. When the portion of the third link 58 that is on the second side comes into contact with the stopper 22, the rotation of the third link 58 in a first direction (a direction R1 indicated in FIG. 2) is stopped.

Figure 3:
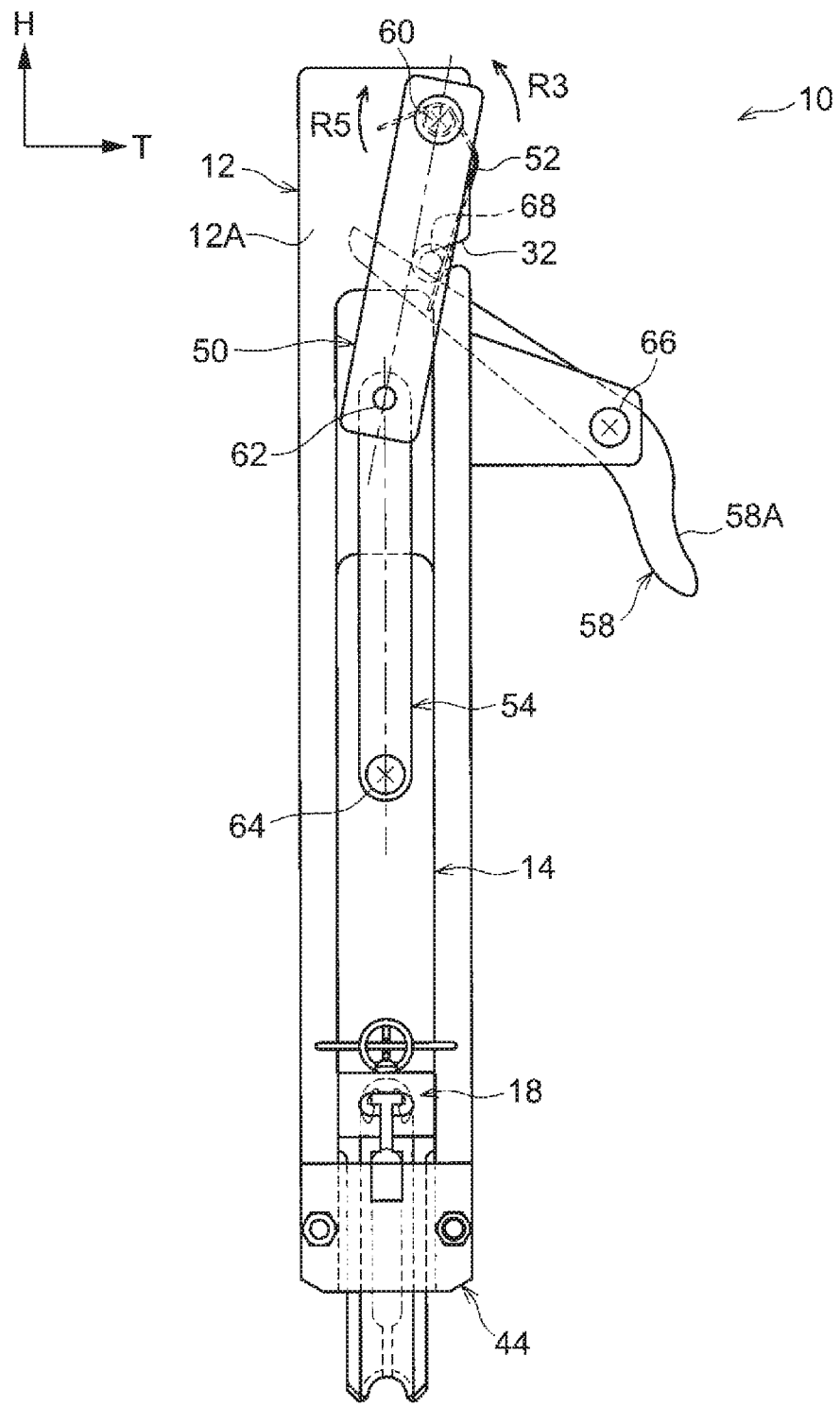
FIG. 3 is a front view of the retaining-ring-attaching tool according to the first exemplary embodiment of the present invention.

When the portion of the third link 58 that is on the second side is in contact with the stopper 22 as illustrated in FIGS. 1 to 3, the second link 54 extends in the top-bottom direction while the first link 50 is inclined with respect to the top-bottom direction with the first end thereof being on the front side with respect to the second end thereof. In this state, the holding portion 14 is at the second position.

When the third link 58 that is in contact with the stopper 22 is rotated in a second direction (a direction R2 indicated in FIG. 2), referring to FIGS. 2 and 7, the portion of the third link 58 that is on the second side acts on the first link 50 with the aid of the pin 68, whereby the first link 50 and the second link 54 rotate. With the rotation of the second link 54, the holding portion 14 moves upward. When the upper end of the holding portion 14 comes into contact with the upper-end wall of the groove 30, the first link 50, the second link 54, and the third link 58 stop rotating.

Figure 8:
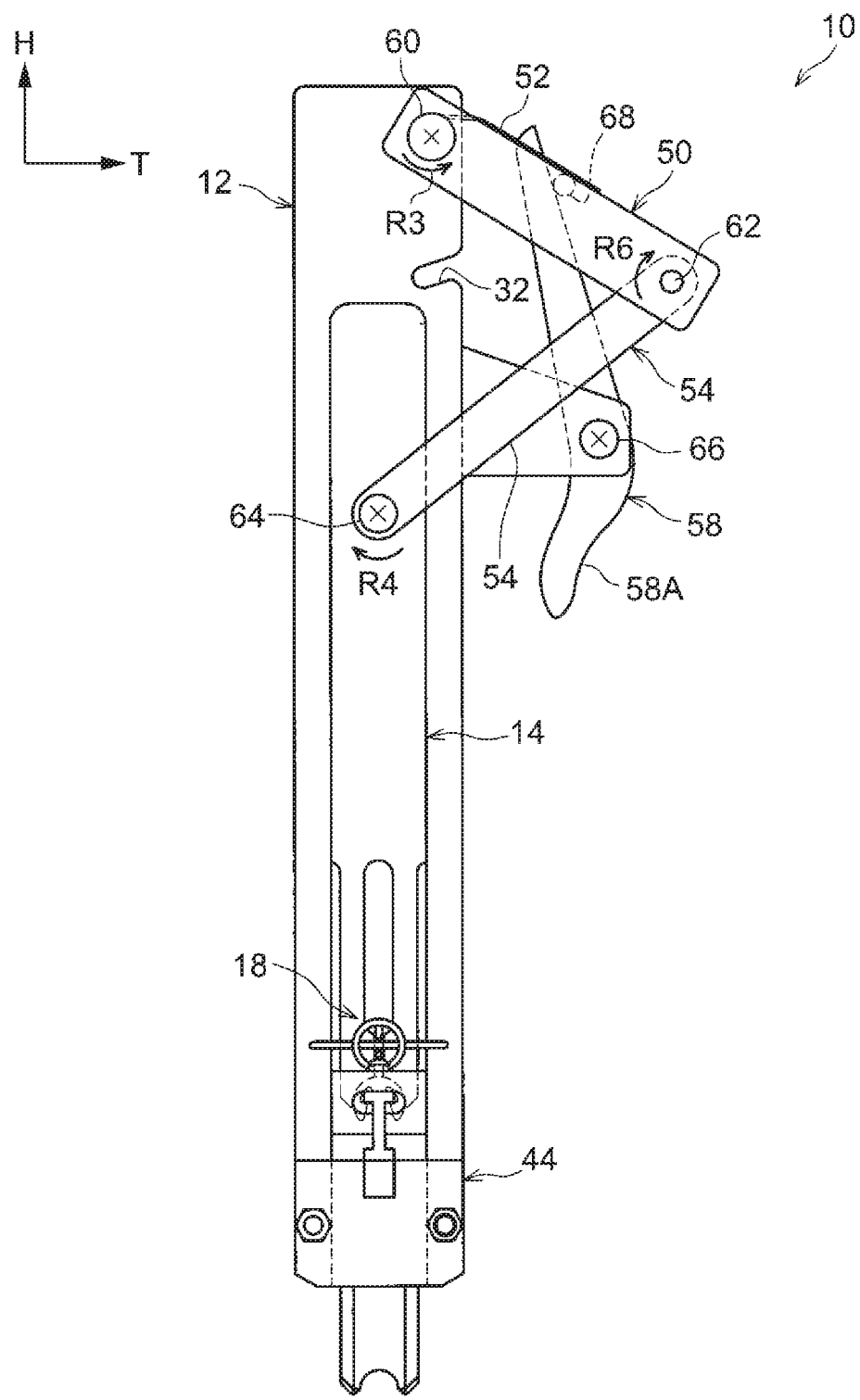
FIG. 8 is another front view of the retaining-ring-attaching tool according to the first exemplary embodiment of the present invention.
Figure 9:
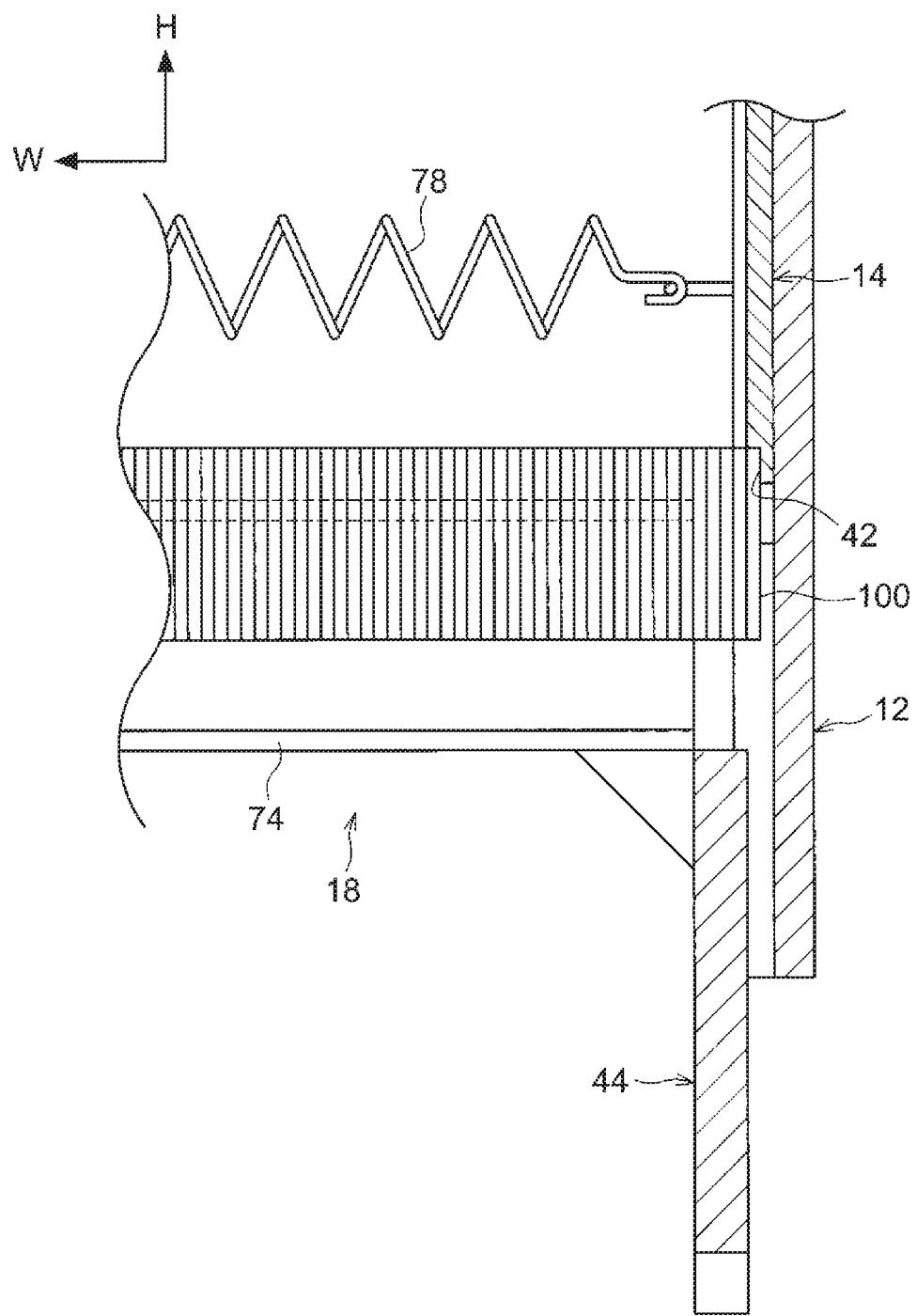
FIG. 9 is another cross-sectional view of the retaining-ring-attaching tool according to the first exemplary embodiment of the present invention.
Figure 10:
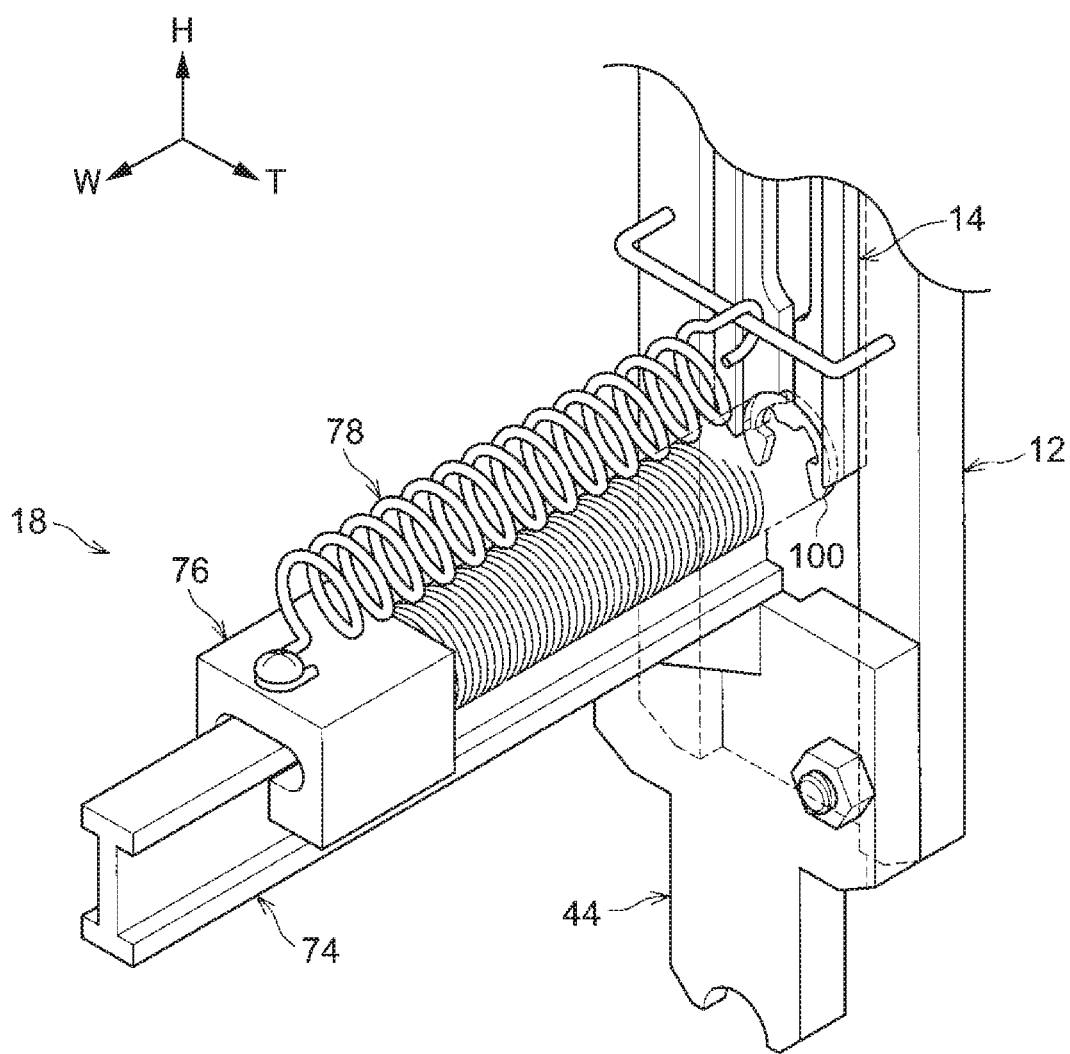
FIG. 10 is another enlarged perspective view of the retaining-ring-attaching tool according to the first exemplary embodiment of the present invention.

Specifically, when the rotational force exerted by the third link 58 acts on the first link 50 with the aid of the pin 68, referring to FIGS. 3 and 8, the first link 50 rotates about the rod member 60 in a direction R3 (counterclockwise), whereby the rod member 62 moves upward. Furthermore, the second link 54 rotates about the rod member 62 in a direction R6 (clockwise) and about the rod member 64 in a direction R4 (clockwise).

Thus, the holding portion 14 moves upward to the first position and is retained at the first position.

Covering

Figure 13:
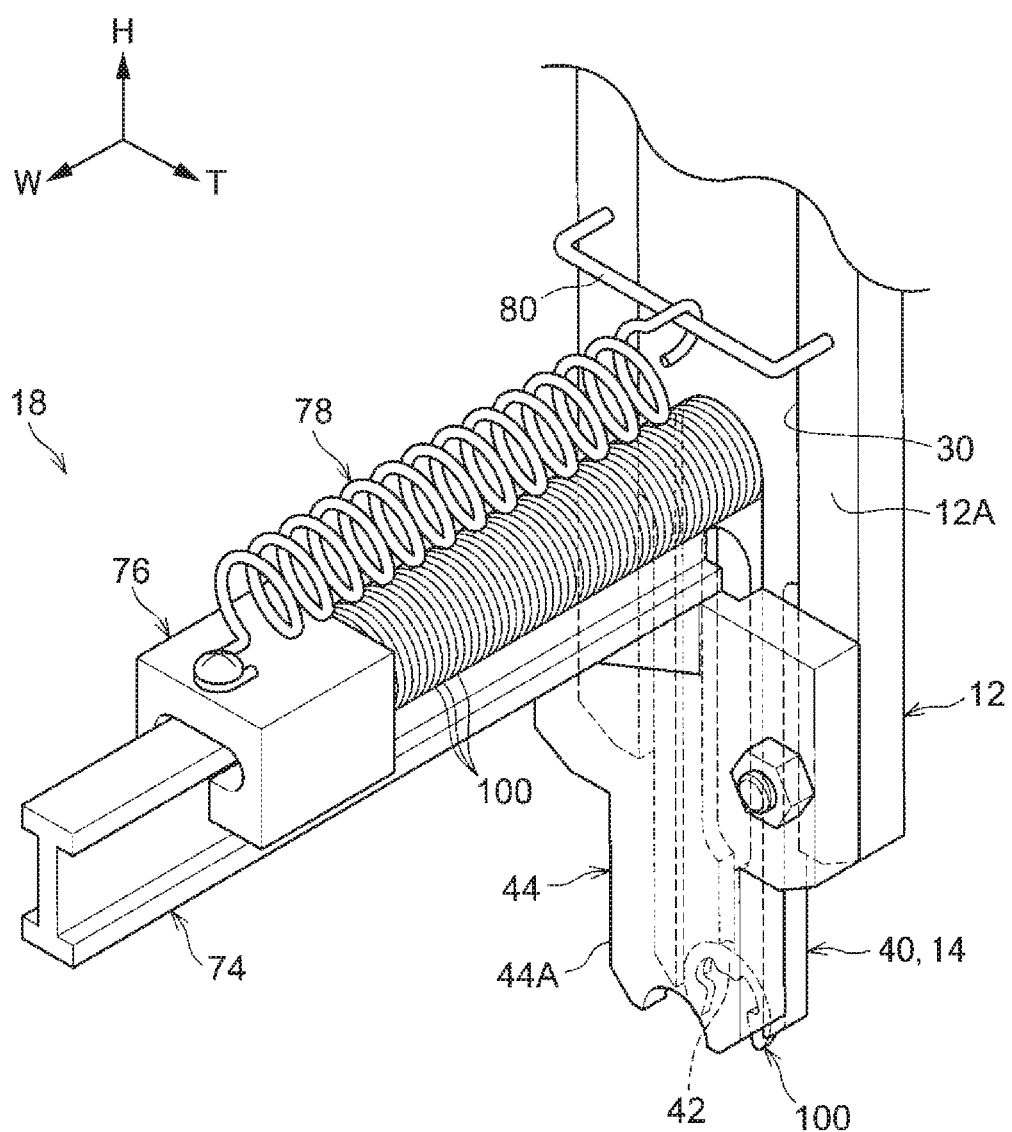
FIG. 13 is yet another enlarged perspective view of the retaining-ring-attaching tool according to the first exemplary embodiment of the present invention.

Referring to FIGS. 13 and 18, the covering 44 is attached to the lower end of the body 12 with a bolt 70A and a nut 70B in such a manner as to cover a lower-end part of the side face 12A of the body 12.

The covering 44 includes, at the lower end thereof, a supporting portion 44A whose lower edge conforms to, when seen in the widthwise direction, the lower edge of the holding portion 14 that is at the second position. The supporting portion 44A and the holding portion 14 hold therebetween the retaining ring 100 in the notch 42 of the holding portion 14 when the holding portion 14 is at the second position.

Feeding Portion

Referring to FIG. 13, the feeding portion 18 includes a rail 74 attached to the upper end of the covering 44, a block 76 attached to the rail 74 in such a manner as to be movable along the rail 74, and an extension spring 78 (hereinafter referred to as "spring 78") one end of which is attached to the block 76. Thus, the feeding portion 18 is supported by the body 12 with the aid of the covering 44.

The rail 74 extends in the widthwise direction. One longitudinal end (on the right side in FIG. 13) of the rail 74 faces the groove 30 provided in the body 12. The rail 74 supports plural retaining rings 100 that are stacked in the widthwise direction, whereby the retaining rings 100 are movable in the widthwise direction along the rail 74. The retaining rings 100 supported by the rail 74 in turns come to face, in the widthwise direction, the notch 42 of the holding portion 14 that is at the first position (see FIG. 10).

The block 76 presses the stack of retaining rings 100 supported by the rail 74 against the body 12.

The spring 78 extends in the widthwise direction with one end thereof attached to the block 76 and the other end thereof hooked on a rod 80 attached to the body 12 and extending across the groove 30. Thus, the spring 78 exerts an elastic force that urges the stack of retaining rings 100 on the rail 74 toward the body 12 with the aid of the block 76.

Functions

Functions of the attaching tool 10 will now be described by describing a method of manufacturing a shaft by using the attaching tool 10 (a shaft-manufacturing method).

Referring to FIGS. 1 and 2, when the attaching tool 10 is not operated, the torsion spring 52 keeps urging the pin 68 such that the pin 68 is fitted in the recess 32 and is pressed against the peripheral wall of the recess 32. Furthermore, the torsion spring 52 is urging the third link 58 with the aid of the pin 68 such that the third link 58 is pressed against the stopper 22.

Figure 4:
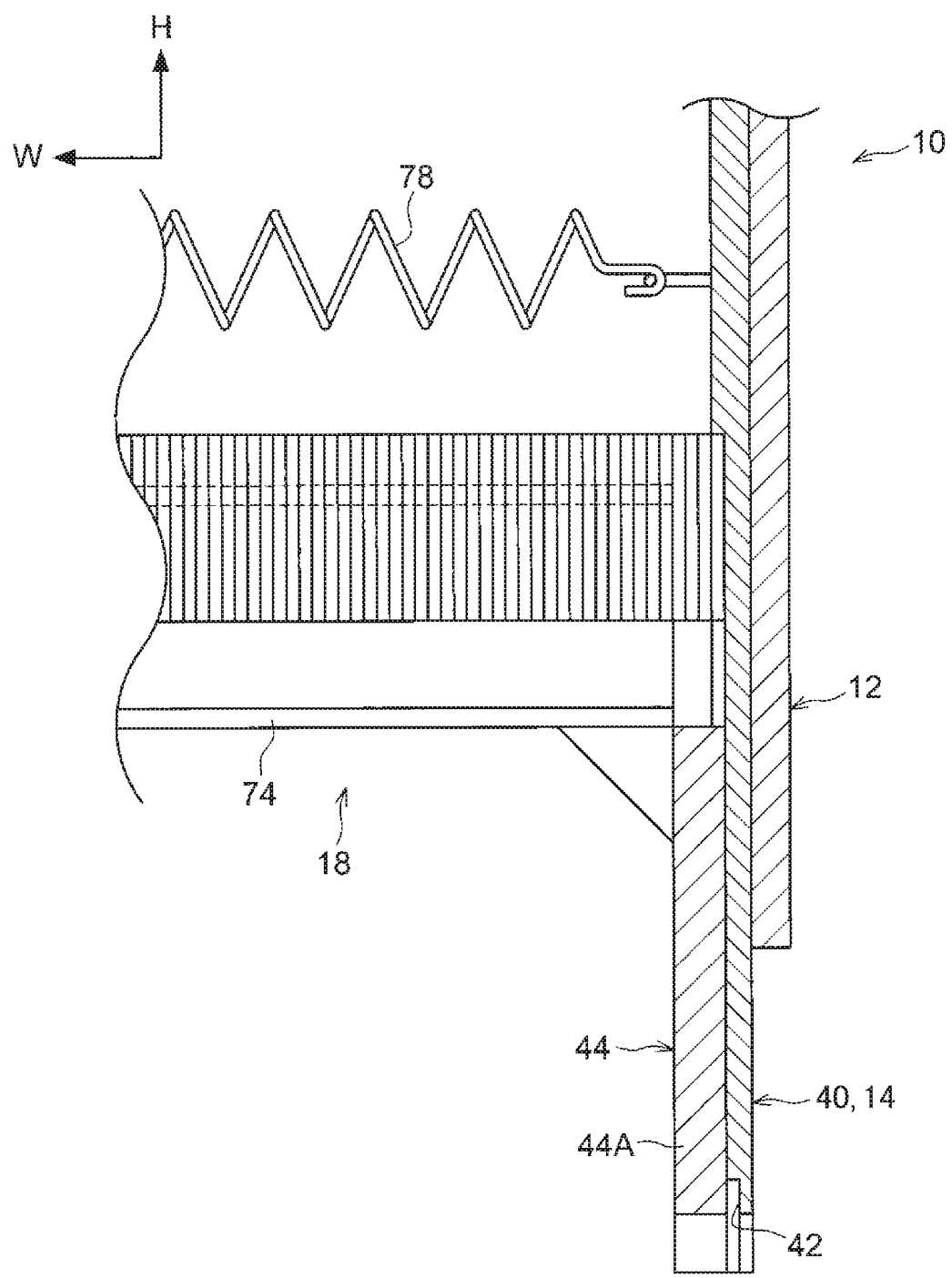
FIG. 4 is a cross-sectional view of the retaining-ring-attaching tool according to the first exemplary embodiment of the present invention.
Figure 5:
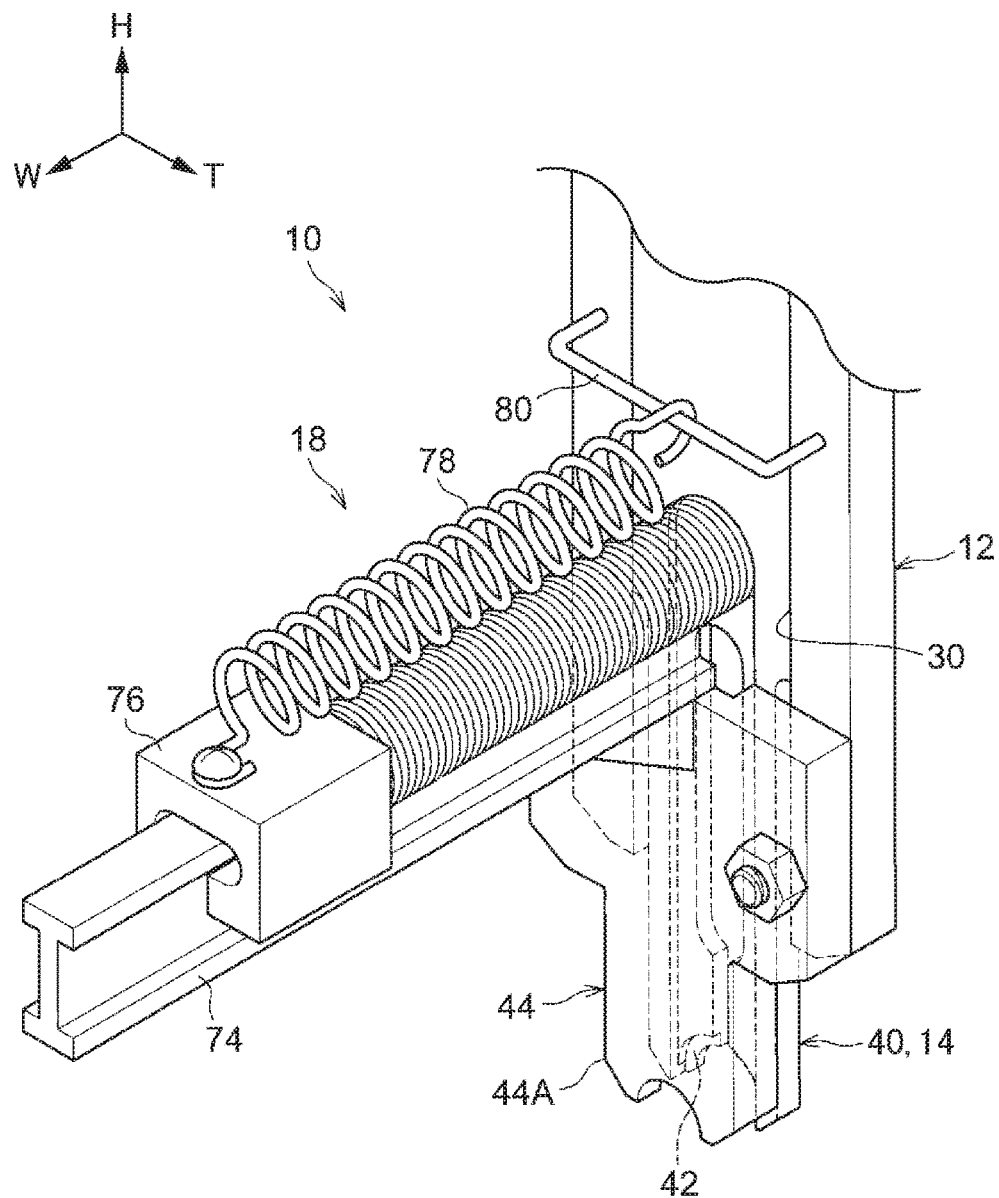
FIG. 5 is an enlarged perspective view of the retaining-ring-attaching tool according to the first exemplary embodiment of the present invention.

In the above state, as illustrated in FIG. 3, the second link 54 extends in the top-bottom direction, and the first link 50 is inclined with respect to the top-bottom direction with the first end thereof being on the front side with respect to the second end thereof. Furthermore, the holding portion 14 is at the second position. In this state, as illustrated in FIGS. 4 and 5, no retaining ring 100 is held in the notch 42 of the holding portion 14.

Referring to FIGS. 1 and 2, the worker first presses (pulls) the operation portion 58A of the third link 58 toward the body 12 with the finger F of the hand P holding the attaching tool 10, whereby the third link 58 rotates about the rod member 66 in the direction R2 indicated in FIG. 2.

The rotational force exerted by the third link 58 acts on the first link 50 with the aid of the pin 68, whereby the first link 50 and the second link 54 rotate. Specifically, referring to FIG. 8, the first link 50 rotates about the rod member 60 in the direction R3. With the rotation of the first link 50, the second link 54 rotates about the rod member 62 in the direction R6 and about the rod member 64 in the direction R4.

As a result, the holding portion 14 moves upward, and the upper end of the holding portion 14 comes into contact with the upper-end wall of the groove 30. Thus, the movement of the holding portion 14 is stopped, and the first link 50, the second link 54, and the third link 58 stop rotating.

In this state, the holding portion 14 is at the first position. Furthermore, referring to FIGS. 9 and 10, the notch 42 of the holding portion 14 faces, in the widthwise direction, the stack of retaining rings 100 supported by the rail 74, and the feeding portion 18 feeds a first one (on the side opposite the block 76) of the retaining rings 100 to the notch 42 with the elastic force exerted by the spring 78.

Subsequently, the worker removes the pressing force having been applied, with the finger F, to the operation portion 58A of the third link 58 from the operation portion 58A. Accordingly, the first link 50, the second link 54, and the third link 58 rotate with the elastic force exerted by the torsion spring 52, the holding portion 14 moves downward, and the attaching tool 10 falls into the unoperated state again, as illustrated in FIG. 11.

Figure 12:
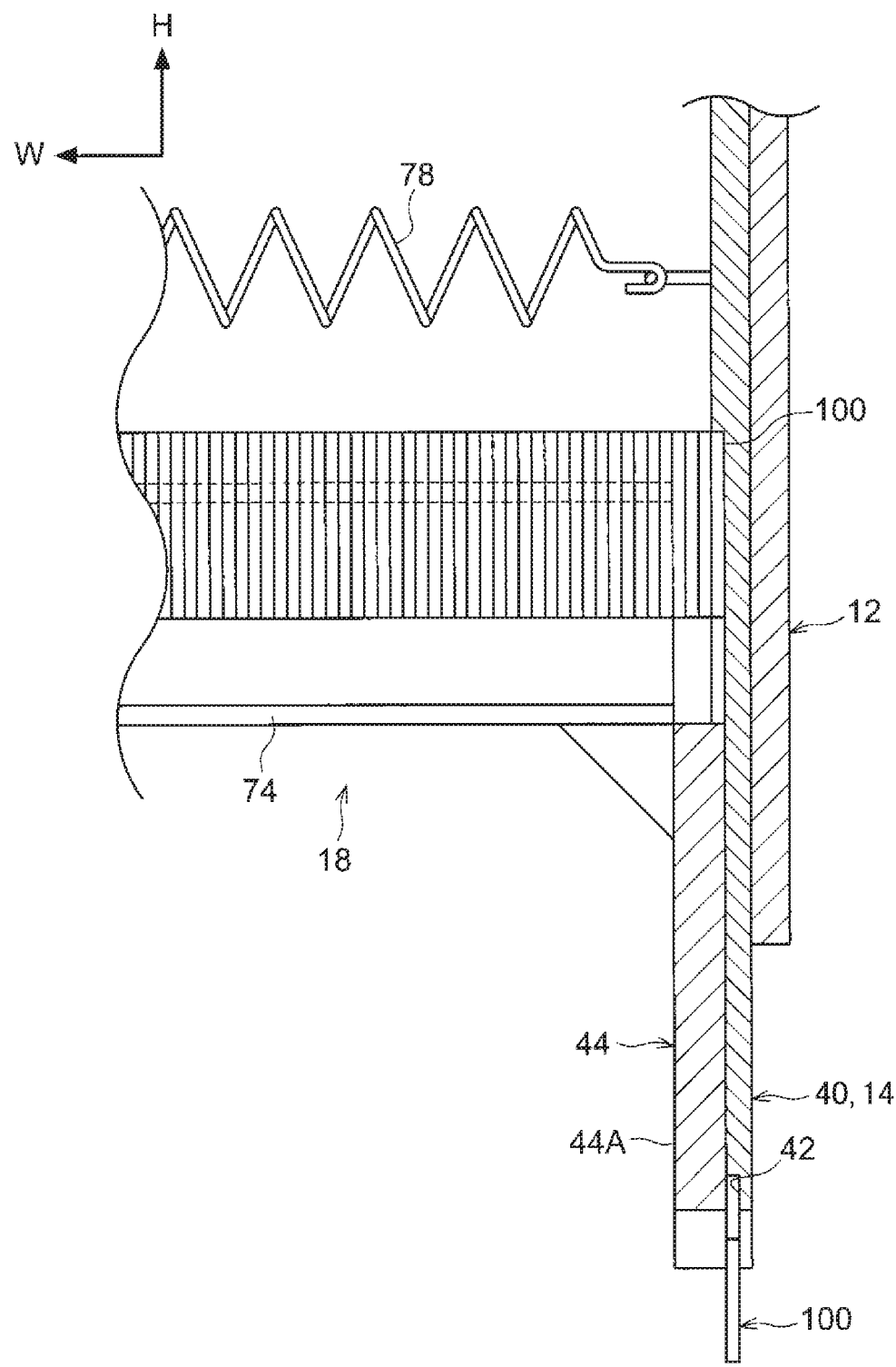
FIG. 12 is yet another cross-sectional view of the retaining-ring-attaching tool according to the first exemplary embodiment of the present invention.

In this state, the holding portion 14 is at the second position. The notch 42 of the holding portion 14 that is at the second position holds the above retaining ring 100 as illustrated in FIGS. 12 and 13. Furthermore, the supporting portion 44A of the covering 44 and the holding portion 14 hold therebetween the retaining ring 100 in the notch 42.

Subsequently, referring to FIG. 11, the worker brings the attaching tool 10 to a position above the shaft member 120 having the groove 120A and then lowers the attaching tool 10, whereby, as illustrated in FIG. 16B, two of the projections 102 that are at two respective ends of the retaining ring 100 come into contact with the groove 120A of the shaft member 120.

When the worker further lowers the attaching tool 10, the holding portion 14 is also lowered. Thus, as illustrated in FIG. 16C, the retaining ring 100 elastically deforms such that the projections 102 at the two respective ends thereof move away from each other, and the tip part 40 of the holding portion 14 elastically deforms such that the width of the slit 40A increases.

In the above process, a force that moves the holding portion 14 upward acts on the holding portion 14. Referring to FIG. 3, when the force that moves the holding portion 14 upward acts on the holding portion 14, a force that moves the second link 54 upward acts on the second link 54. Furthermore, when the force that moves the second link 54 upward acts on the second link 54, a force that rotates the first link 50 about the rod member 60 in the direction R5 (clockwise) acts on the first link 50. However, since the pin 68 is in contact with the peripheral wall of the recess 32, the rotation of the first link 50 is stopped. Hence, even if the force that moves the holding portion 14 upward acts on the holding portion 14, the holding portion 14 is prevented from moving upward.

Then, as illustrated in FIG. 16D, the projections 102 at the two respective ends of the retaining ring 100 that have been moving downward along the groove 120A each go over the point of the shaft member 120 where the diameter of the shaft member 120 at the bottom of the groove 120A is largest. When the projections 102 at the two respective ends of the retaining ring 100 each go over the above point of the shaft member 120, the tip part 40 and the retaining ring 100 elastically restore their original forms, respectively, and the retaining ring 100 is tightly fitted in the groove 120A of the shaft member 120. The worker then moves the attaching tool 10 upward. Thus, a shaft 140 is obtained (see FIG. 15).

To manufacture plural shafts 140 successively, the above series of steps are performed repeatedly.

Summary of First Exemplary Embodiment

As described above, with the link mechanism 16 configured such that the holding portion 14 is moved with the finger F of the hand P holding the body 12, the retaining ring 100 is attachable to the shaft member 120 only by the movement of the finger F. That is, the retaining ring 100 is attachable to the shaft member 120 with one hand. Furthermore, since a stack of retaining rings 100 are set in the feeding portion 18, plural retaining rings 100 are successively attachable to plural shaft members 120 with one hand.

Furthermore, since the torsion spring 52 is employed, when the operating force is removed from the operation portion 58A of the third link 58, the holding portion 14 is moved to the second position.

Furthermore, in the above shaft-manufacturing method, the shaft 140 is manufacturable more easily than in a case where the attaching tool 10 is not used.

Second Exemplary Embodiment

Referring to FIGS. 19 to 23, a retaining-ring-attaching tool and a shaft-manufacturing method according to a second exemplary embodiment of the present invention will now be described. Elements that are the same as those described in the first exemplary embodiment are denoted by corresponding ones of the reference numerals used in the first exemplary embodiment, and description of such elements is omitted. The following description focuses on differences from the first exemplary embodiment.

Retaining-Ring-Attaching Tool

A retaining-ring-attaching tool 210 (hereinafter referred to as "attaching tool 210") according to the second exemplary embodiment is a tool used in manufacturing a shaft by attaching, from a lateral side of the shaft, the retaining ring 100 to a groove of a shaft member extending in the top-bottom direction.

Figure 19:
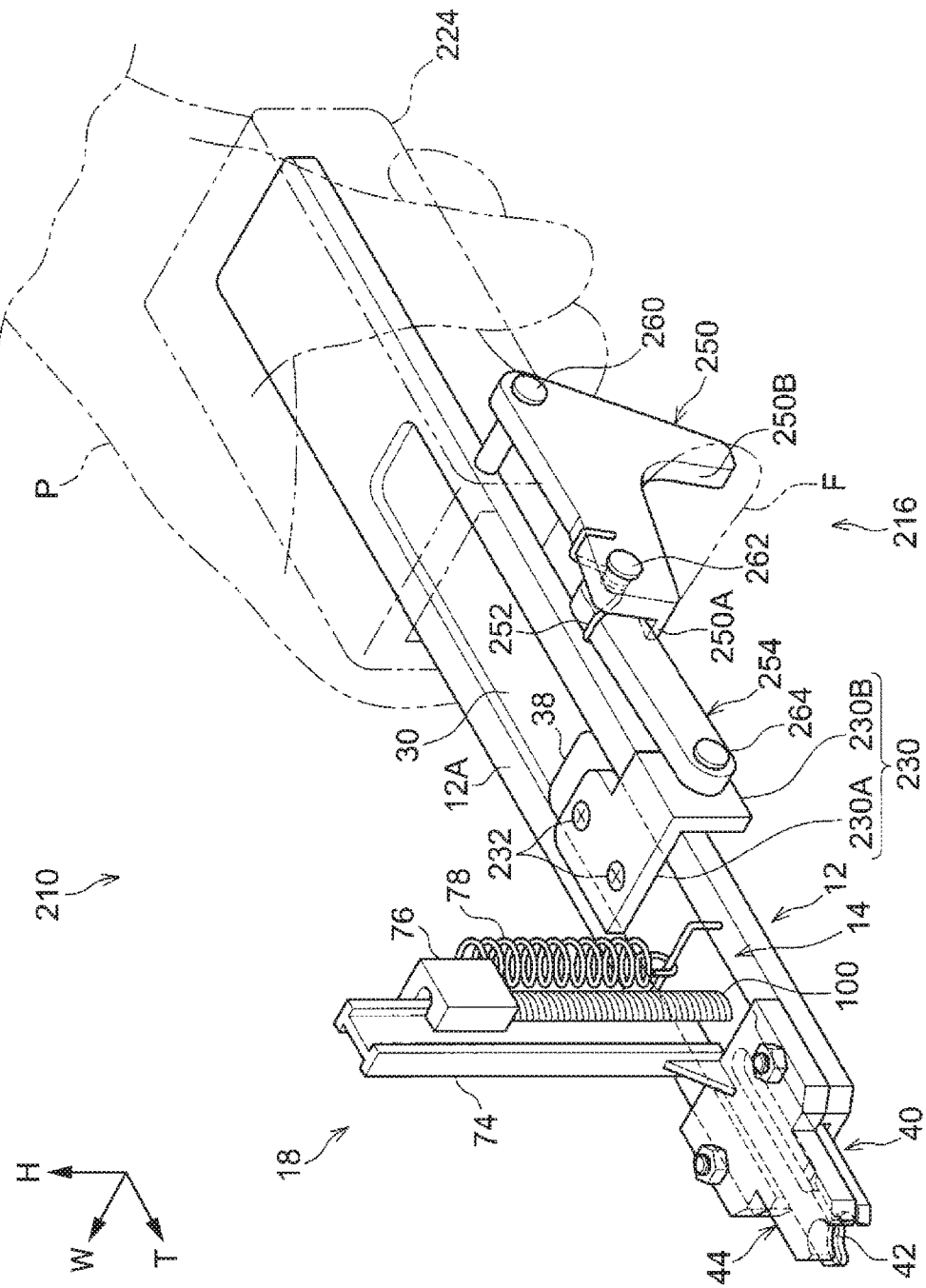
FIG. 19 is a perspective view of a retaining-ring-attaching tool according to a second exemplary embodiment of the present invention.

Referring to FIG. 19, the attaching tool 210 includes the body 12, the holding portion 14 having the notch 42 in which the retaining ring 100 is held, a link mechanism 216 that moves the holding portion 14, the feeding portion 18 that feeds the retaining ring 100 to the notch 42, and the covering 44. A part of the retaining ring 100 fed to the notch 42 of the holding portion 14 is held between the holding portion 14 and the covering 44.

Body and Holding Portion

The body 12 extends in the front-rear direction and has the groove 30 that is open on the upper side. The holding portion 14 includes the base part 38 and the tip part 40. The base part 38 is fitted in the groove 30. The tip part 40 is continuous with the base part 38 and extends from a first end (the left end in FIG. 19), in the front-rear direction, of the base part 38. The tip part 40 has the notch 42.

The body 12 is provided with a grip 224 that covers a second end thereof (the right end in FIG. 19) in the front-rear direction. The worker uses the attaching tool 210 by holding the grip 224 with the hand P. In other words, the worker holds the body 12 by the grip 224.

In the above configuration, the holding portion 14 is movable between a first position (see FIG. 21) where the feeding portion 18 feeds the retaining ring 100 to the notch 42 and a second position (see FIGS. 19 and 20) where the retaining ring 100 held in the notch 42 is ready to be attached to a shaft member (not illustrated).

Covering and Feeding Portion

The covering 44 covers, from the upper side, a part of the body 12 that is at the first end (the left end in FIGS. 19 to 21) in the front-rear direction. The feeding portion 18 is provided on the upper side of the body 12 and extends in the top-bottom direction Link Mechanism Referring to FIGS. 19 to 21, the link mechanism 216 includes a first link 250, a first end of which is rotatably supported by the body 12. The link mechanism 216 further includes a supporting member 230 and a second link 254. The supporting member 230 is fixed to the holding portion 14. A first end of the second link 254 is rotatably supported by a second end of the first link 250. A second end of the second link 254 is rotatably supported by the supporting member 230.

First Link

Figure 20:
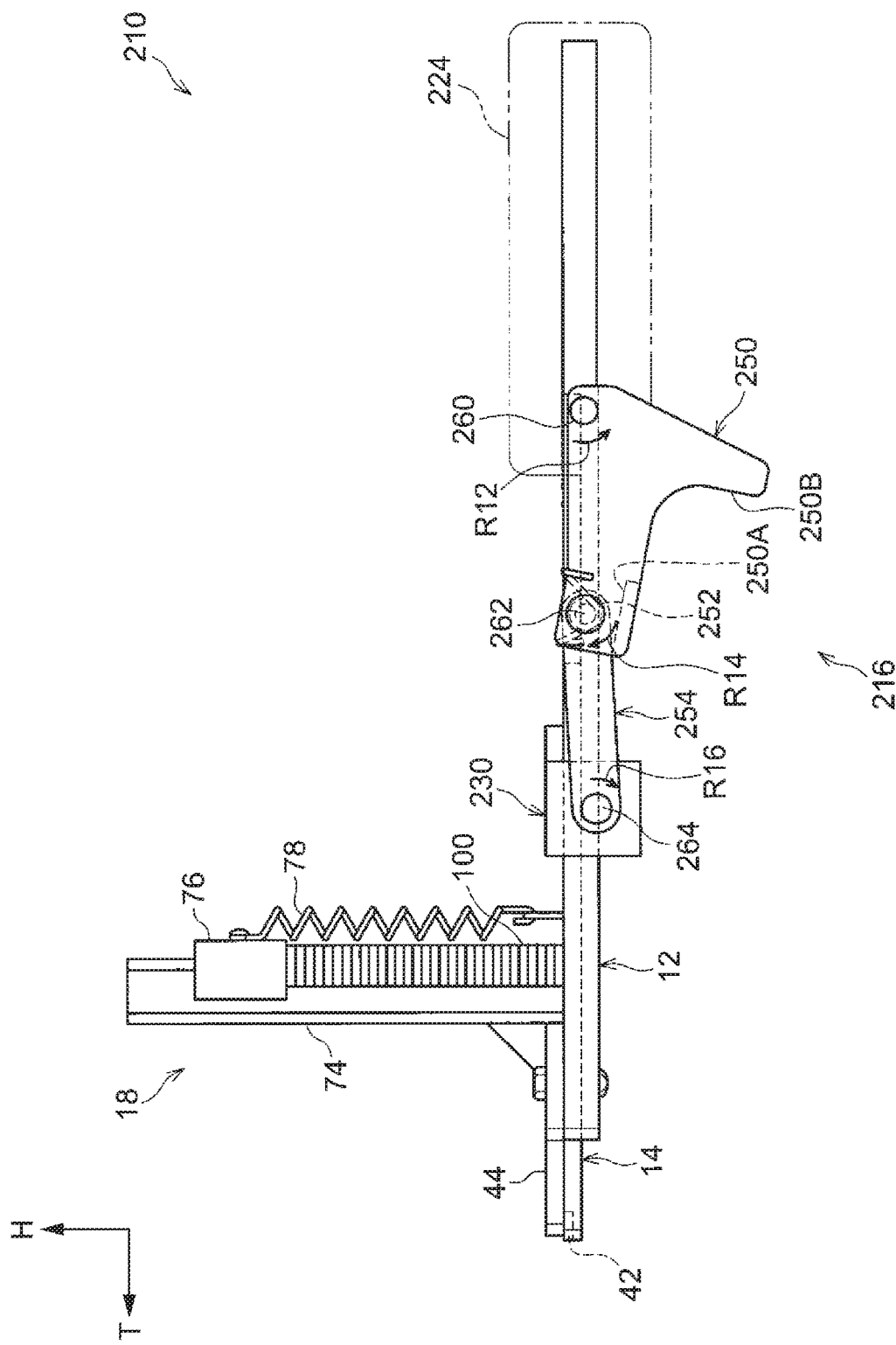
FIG. 20 is a side view of the retaining-ring-attaching tool according to the second exemplary embodiment of the present invention.
Figure 21:
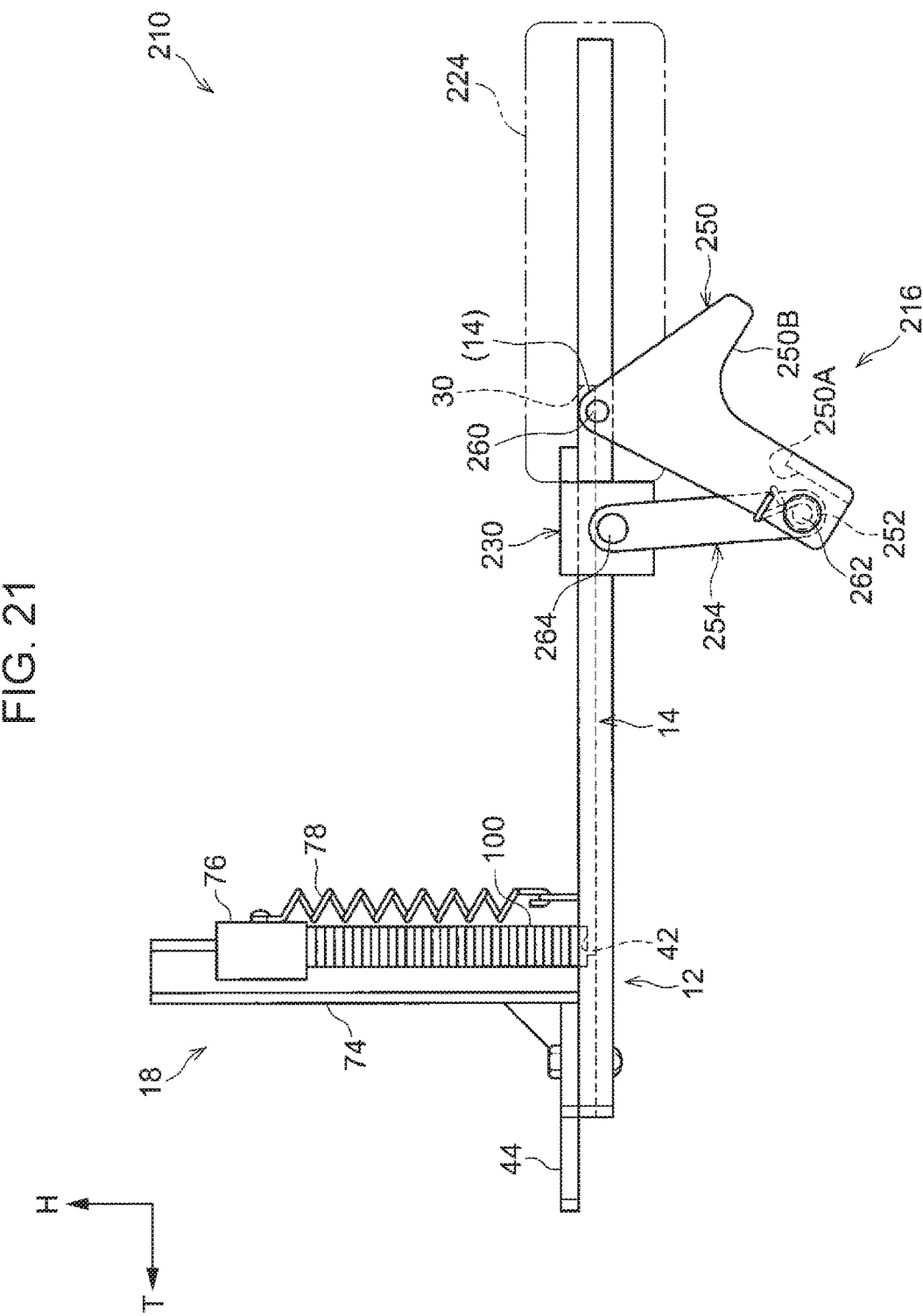
FIG. 21 is another side view of the retaining-ring-attaching tool according to the second exemplary embodiment of the present invention.

The first link 250 is provided on a first side of the body 12 in the widthwise direction (on the near side in FIGS. 19 to 21). The first end of the first link 250 is rotatably supported by the body 12 with the aid of a rod member 260 extending in the widthwise direction. The rod member 260 passes through a through hole provided in the grip 224, with a proximal end thereof fixed to the body 12.

The first link 250 includes a rib 250A provided at the second end thereof and projecting toward the body 12. The first link 250 further includes an operation portion 250B projecting downward from a position between the first end and the second end thereof. The operation portion 250B is operable with the finger F (the index finger) of the hand P holding the body 12. Specifically, when the holding portion 14 is at the second position, the operation portion 250B extends downward (see FIGS. 19 and 20).

Supporting Member

The supporting member 230 has an L shape and includes a horizontal portion 230A and a vertical portion 230B. The horizontal portion 230A has a major surface extending horizontally and is fixed to the base part 38 of the holding portion 14 with fastening members 232. The vertical portion 230B has a major surface projecting downward from a first widthwise end of the horizontal portion 230A and extending vertically.

Second Link

The second link 254 is provided on the first side (the near side in FIGS. 19 and 20) of the body 12 in the widthwise direction and on the first side with respect to the first link 250 in the front-rear direction. The first end of the second link 254 is positioned on a side nearer to the body 12 with respect to the second end of the first link 250 and is rotatably supported by the second end of the first link 250 with the aid of a rod member 262 extending in the widthwise direction. The second end of the second link 254 is rotatably supported by the vertical portion 230B of the supporting member 230 with the aid of a rod member 264 extending in the widthwise direction.

Figure 23:
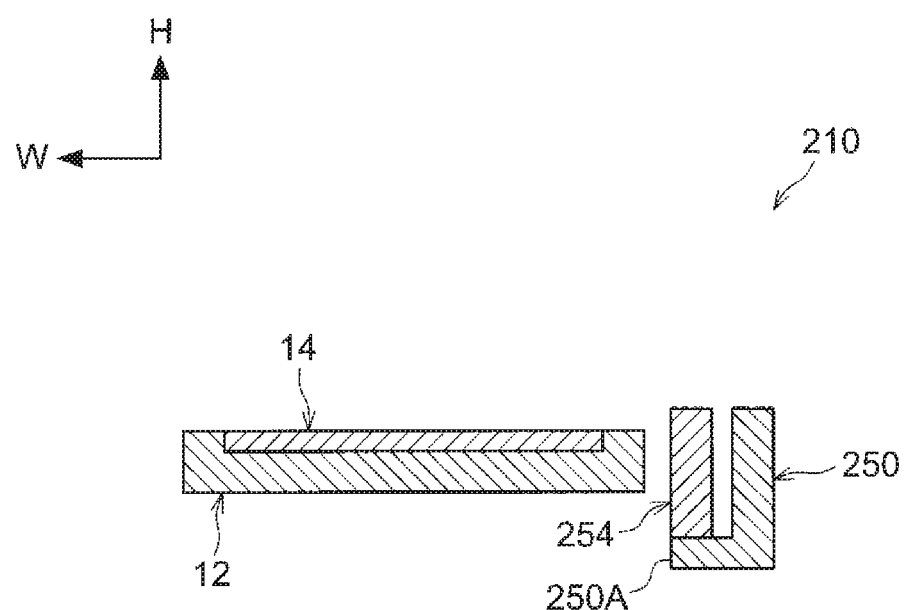
FIG. 23 is a cross-sectional view of the retaining-ring-attaching tool according to the second exemplary embodiment of the present invention.

Referring to FIG. 23, when the holding portion 14 is at the second position, the second link 254 is rested on the rib 250A of the first link 250, that is, the second link 254 is in contact with the rib 250A in the top-bottom direction. Specifically, the second link 254 and the rib 250A are in contact with each other on the first side in the front-rear direction with respect to the rod member 262. Hence, the second link 254 is prevented from rotating, relative to the first link 250, about the rod member 262 in a direction in which the rod member 262 moves upward relative to the second link 254.

Referring to FIG. 20, when the holding portion 14 is at the second position and the attaching tool 10 is seen in the widthwise direction, the rod member 262 is positioned on the upper side with respect to a line connecting the center of the rod member 260 and the center of the rod member 264. The rod member 262 is provided with a torsion spring 252 as an exemplary force-applying portion.

Torsion Spring

Referring to FIGS. 19 and 21, the torsion spring 252 is provided around the rod member 262 and between the first link 250 and the second link 254. One end of the torsion spring 252 is hooked on the first link 250. The other end of the torsion spring 252 is hooked on the second link 254.

In the above configuration, the torsion spring 252 applies an external force (an elastic force) to the first link 250 and to the second link 254 such that the second link 254 comes into contact with the rib 250A of the first link 250 in the top-bottom direction (see FIG. 23). In other words, the torsion spring 252 applies an external force to the holding portion 14 such that the holding portion 14 is urged toward the second position.

Functions

Functions of the attaching tool 210 will now be described by describing a method of manufacturing a shaft by using the attaching tool 210 (a shaft-manufacturing method).

Referring to FIGS. 19 and 20, when the attaching tool 210 is not operated, the torsion spring 252 keeps applying an external force to the first link 250 and to the second link 254 such that the second link 254 and the rib 250A of the first link 250 are kept in contact with each other in the top-bottom direction.

Figure 22A:
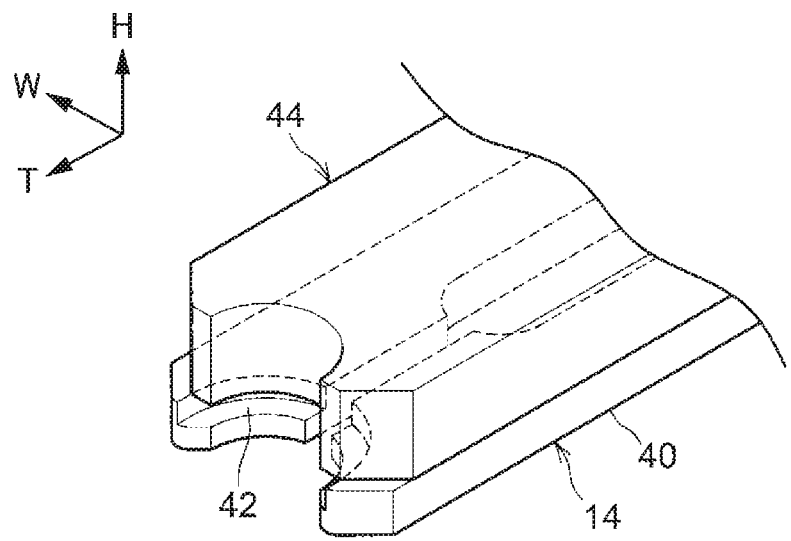
FIGS. 22A and 22B are perspective views of a tip of the retaining-ring-attaching tool according to the second exemplary embodiment of the present invention.

In this state, the holding portion 14 is at the second position, and no retaining ring 100 is held in the notch 42 of the holding portion 14 (see FIG. 22A).

Referring to FIG. 19, the worker first pulls the operation portion 250B of the first link 250 toward the second side in the front-rear direction with the finger F of the hand P holding the attaching tool 210, whereby, referring to FIGS. 20 and 21, the first link 250 rotates about the rod member 260 in a direction R12 indicated in FIG. 20. With the rotation of the first link 250, the second link 254 rotates about the rod member 262 in a direction R14 indicated in FIG. 20 and about the rod member 264 in a direction R16 indicated in FIG. 20.

The force is transmitted through the supporting member 230 to the holding portion 14, and the holding portion 14 moves toward the second side in the front-rear direction, whereby the end of the holding portion 14 comes into contact with the wall at the end of the groove 30. Therefore, the holding portion 14 stops moving, and the first link 250 and the second link 254 stop rotating.

In this state, the holding portion 14 is at the first position, the notch 42 of the holding portion 14 faces, in the top-bottom direction, the stack of retaining rings 100 supported by the feeding portion 18, and the feeding portion 18 feeds a bottommost one of the retaining rings 100 to the notch 42 with the elastic force exerted by the spring 78.

Subsequently, the worker removes the force having been applied, with the finger F, to the operation portion 250B of the first link 250 from the operation portion 250B. Accordingly, the first link 250 and the second link 254 rotate with the elastic force exerted by the torsion spring 252, the holding portion 14 moves toward the first side in the front-rear direction, and the attaching tool 210 falls into the unoperated state again, as illustrated in FIGS. 19 and 20.

Figure 22B:
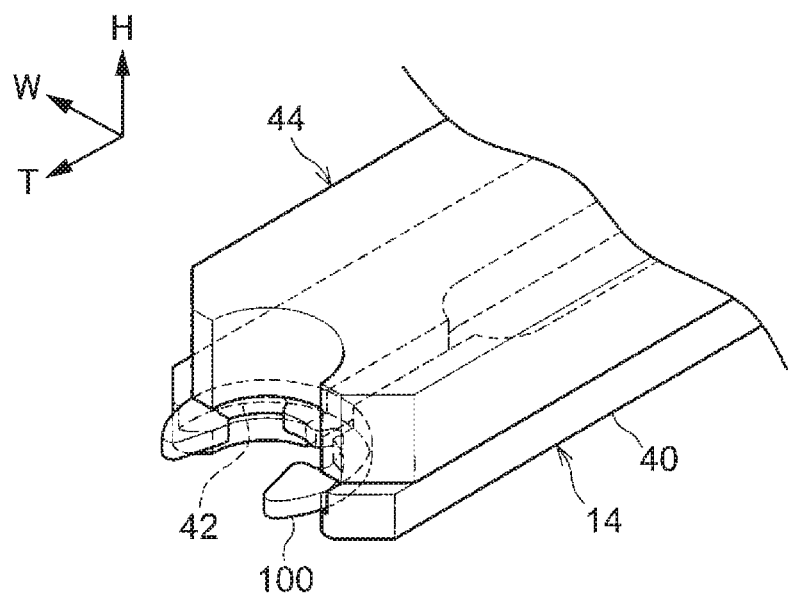

In this state, the holding portion 14 is at the second position. The notch 42 of the holding portion 14 that is at the second position holds the above retaining ring 100 as illustrated in FIG. 22B. That is, since the attaching tool 210 includes the link mechanism 216 that allows the finger F of the hand P holding the body 12 to move the holding portion 14, the retaining ring 100 is attachable to a shaft member (not illustrated) with a movement of the finger F.

Subsequently, the worker moves the attaching tool 210 in the front-rear direction and causes the retaining ring 100 to be fitted into the groove of the shaft member.

Thus, the use of the attaching tool 210 makes it possible to attach the retaining ring 100 to the shaft member with one hand.

Third Exemplary Embodiment

Referring to FIGS. 24 to 29, a retaining-ring-attaching tool and a shaft-manufacturing method according to a third exemplary embodiment of the present invention will now be described. Elements that are the same as those described in the first exemplary embodiment are denoted by corresponding ones of the reference numerals used in the first exemplary embodiment, and description of such elements is omitted. The following description focuses on differences from the first exemplary embodiment.

Retaining-Ring-Attaching Tool

A retaining-ring-attaching tool 310 (hereinafter referred to as "attaching tool 310") according to the third exemplary embodiment is a tool used in manufacturing a shaft by attaching, from a lateral side of the shaft, the retaining ring 100 to a groove of a shaft member extending in the horizontal direction.

Figure 24:
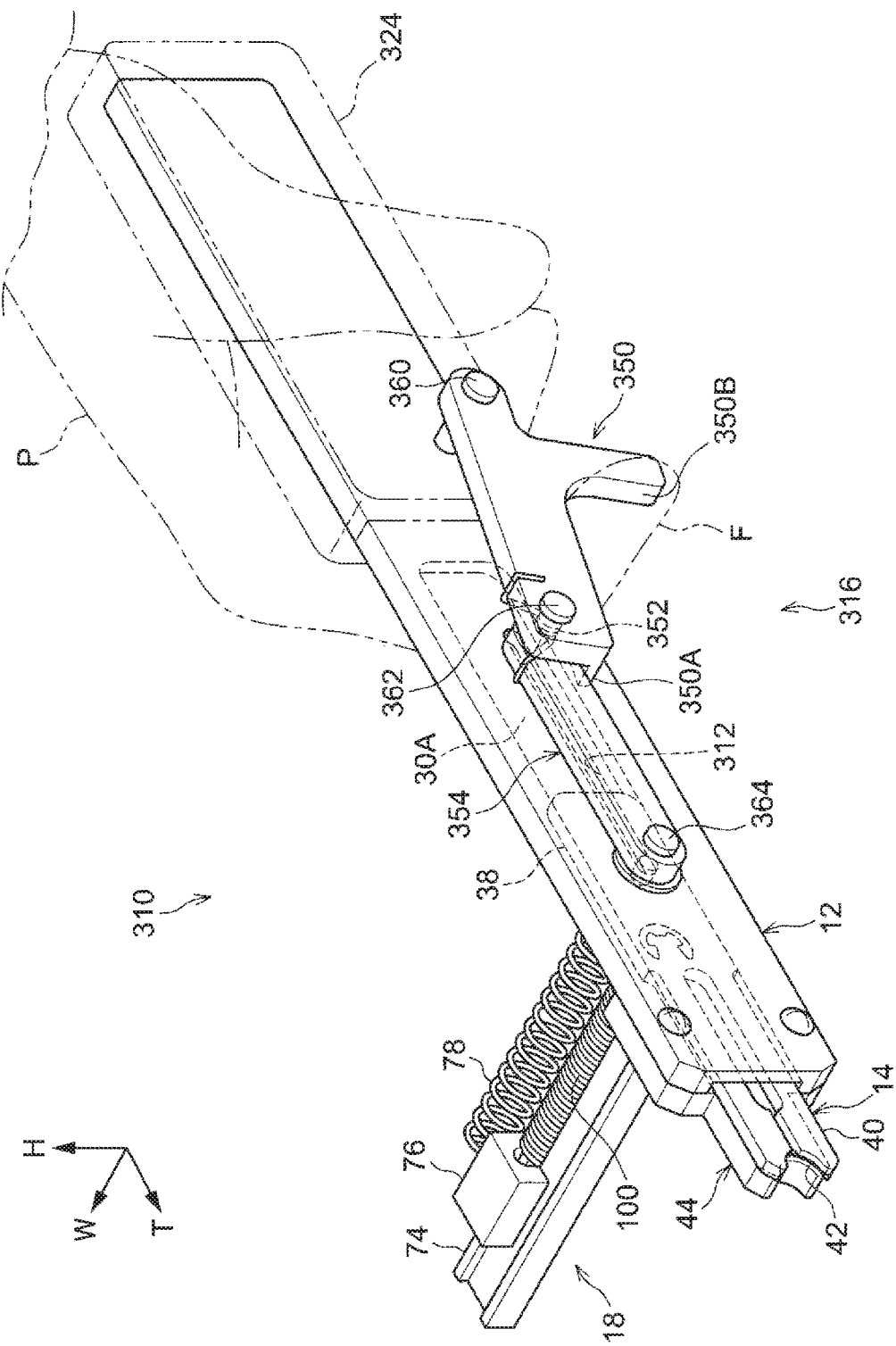
FIG. 24 is a perspective view of a retaining-ring-attaching tool according to a third exemplary embodiment of the present invention.
Figure 25:
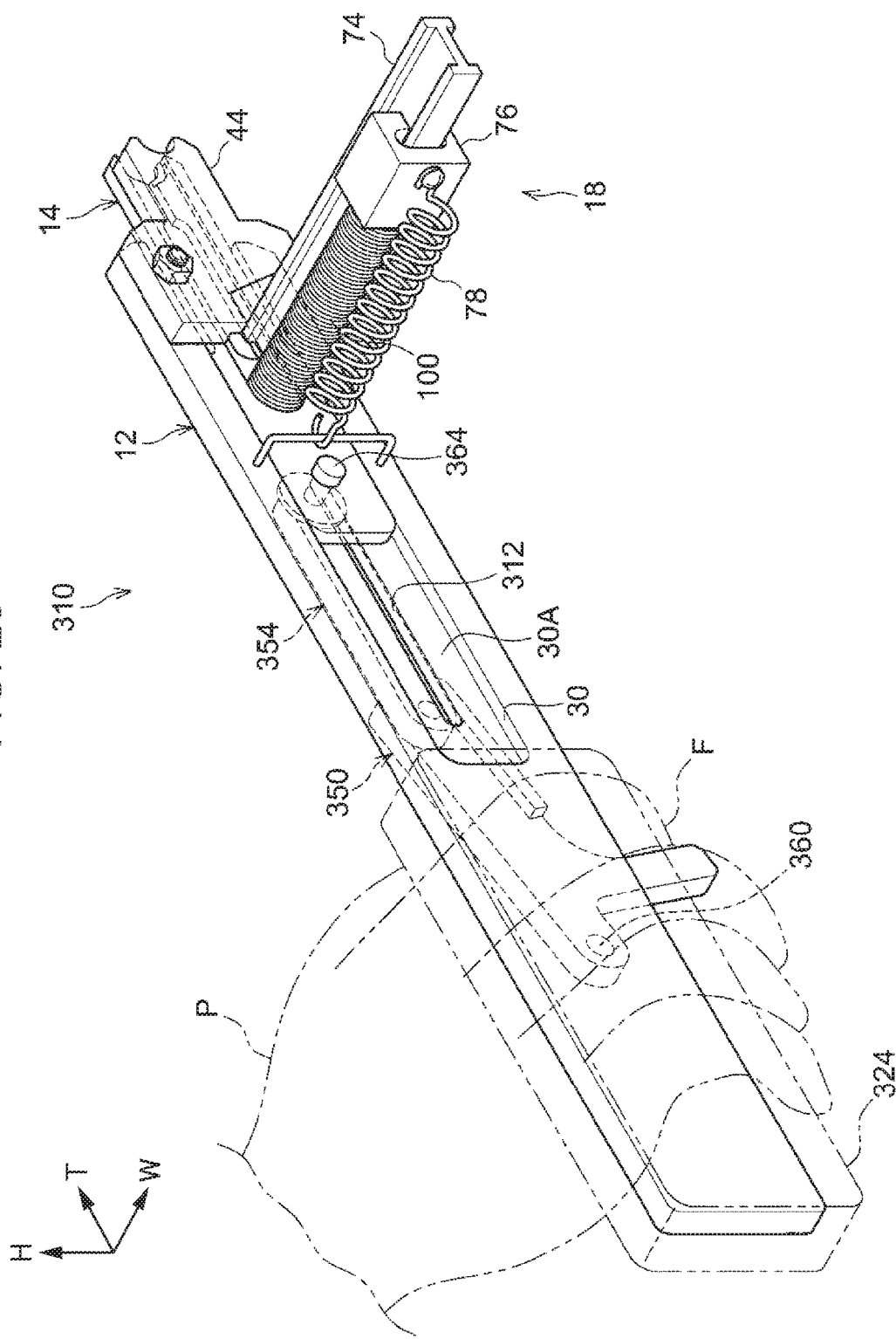
FIG. 25 is another perspective view of the retaining-ring-attaching tool according to the third exemplary embodiment of the present invention.

Referring to FIGS. 24 and 25, the attaching tool 310 includes the body 12, the holding portion 14 having the notch 42 in which the retaining ring 100 is held, a link mechanism 316 that moves the holding portion 14, the feeding portion 18 that feeds the retaining ring 100 to the notch 42, and the covering 44. A part of the retaining ring 100 fed to the notch 42 of the holding portion 14 is held between the holding portion 14 and the covering 44.

Body and Holding Portion

The body 12 extends in the front-rear direction and has the groove 30 that is open on a first side (the far side in FIG. 24) in the widthwise direction. A bottom plate 30A forming the bottom of the groove 30 of the body 12 has an oblong hole 312 (see FIG. 27) extending in the front-rear direction. The holding portion 14 includes the base part 38 and the tip part 40. The base part 38 is fitted in the groove 30. The tip part 40 is continuous with the base part 38 and extends from the first end (the left end in FIG. 24), in the front-rear direction, of the base part 38. The tip part 40 has the notch 42.

The body 12 is provided with a grip 324 that covers the second end thereof in the front-rear direction. The worker uses the attaching tool 310 by holding the grip 324 with the hand P. In other words, the worker holds the body 12 by the grip 324.

In the above configuration, the holding portion 14 is movable between a first position (see FIG. 27) where the feeding portion 18 feeds the retaining ring 100 to the notch 42 and a second position (see FIGS. 24 to 26) where the retaining ring 100 held in the notch 42 is ready to be attached to a shaft member (not illustrated).

Covering and Feeding Portion

The covering 44 covers, from the first side in the widthwise direction, a part of the body 12 that is at the first end (the left end in FIG. 24) in the front-rear direction. The feeding portion 18 is provided on the first side of the body 12 in the widthwise direction and extends in the widthwise direction.

Link Mechanism

Figure 26:
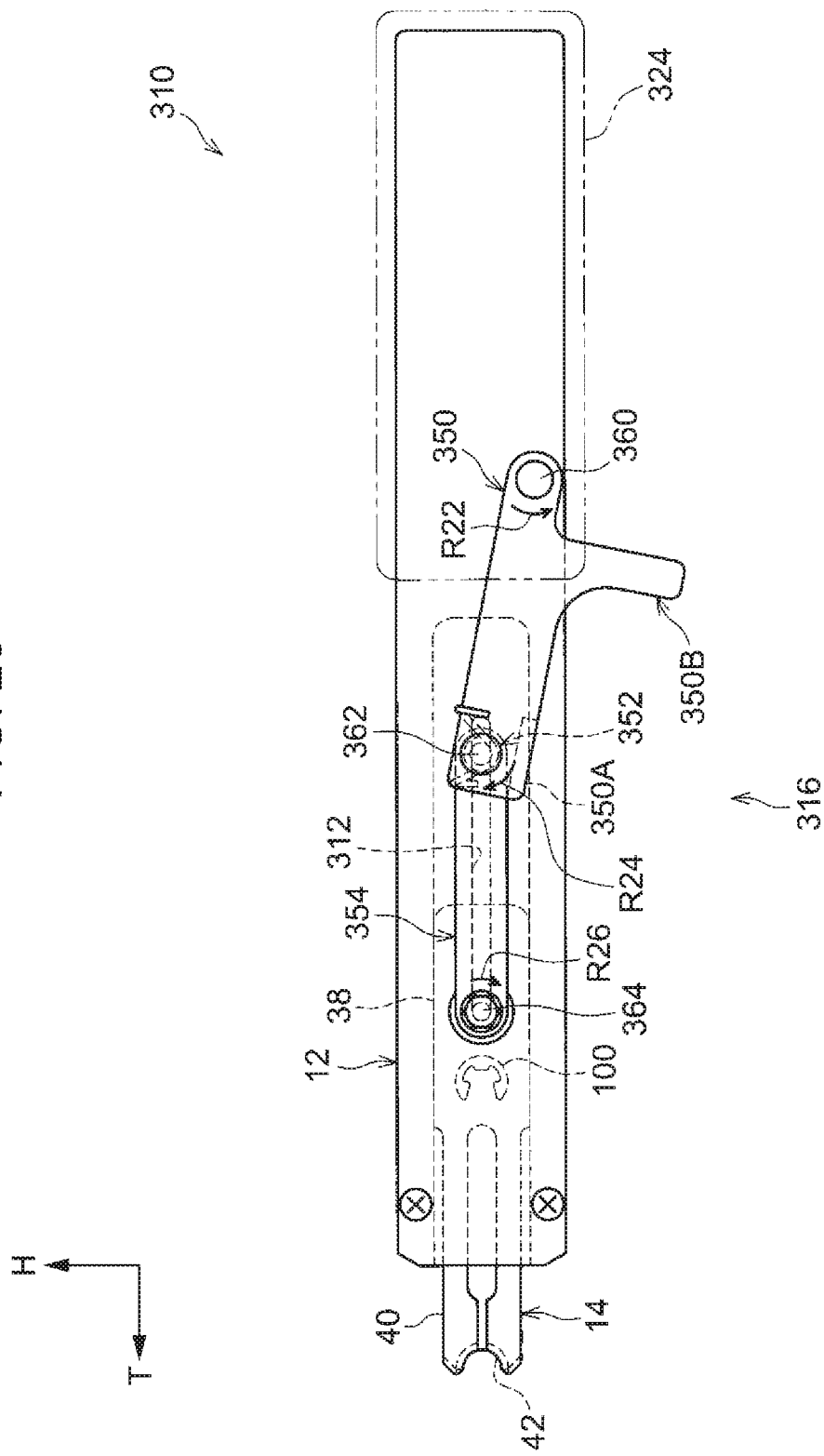
FIG. 26 is a side view of the retaining-ring-attaching tool according to the third exemplary embodiment of the present invention.
Figure 27:
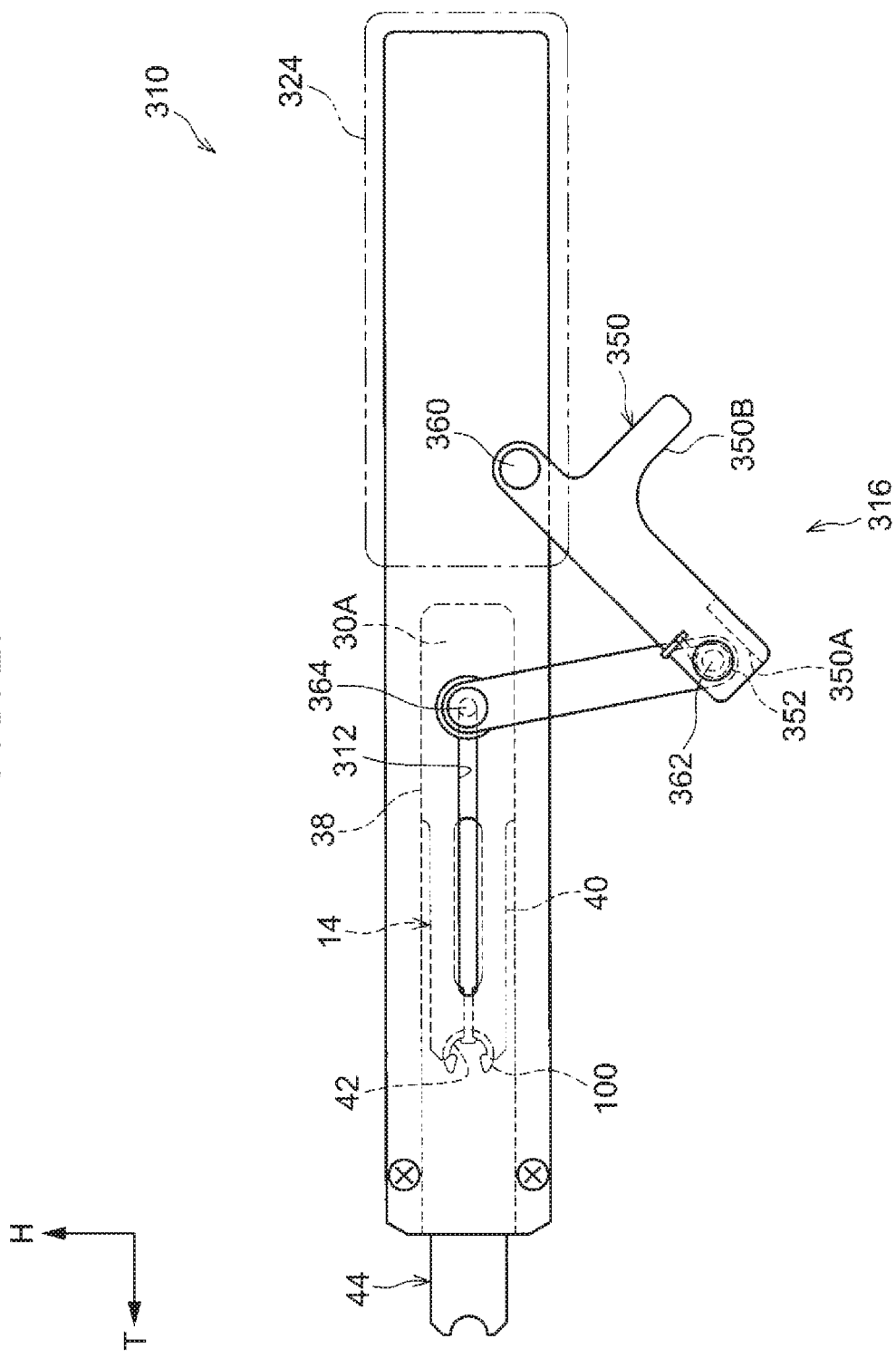
FIG. 27 is another side view of the retaining-ring-attaching tool according to the third exemplary embodiment of the present invention.

Referring to FIGS. 24, 26, and 27, the link mechanism 316 includes a first link 350, a first end of which is rotatably supported by the body 12. The link mechanism 316 further includes a second link 354. A first end of the second link 354 is rotatably supported by a second end of the first link 350. A second end of the second link 354 is rotatably supported by the base part 38 of the holding portion 14.

First Link

The first link 350 is provided on a second side (the near side in FIG. 24) of the body 12 in the widthwise direction. The first end of the first link 350 is rotatably supported by the body 12 with the aid of a rod member 360 extending in the widthwise direction. The rod member 360 passes through a through hole provided in the grip 324, with a proximal end thereof fixed to the body 12.

The first link 350 includes a rib 350A provided at the second end thereof and projecting toward the body 12. The first link 350 further includes an operation portion 350B projecting downward from a position between the first end and the second end thereof. The operation portion 350B is operable with the finger F (the index finger) of the hand P holding the body 12 (see FIGS. 24 and 26).

Second Link

The second link 354 is provided on the second side (the near side in FIG. 24) of the body 12 in the widthwise direction and on the first side of the first link 350 in the front-rear direction. A first end of the second link 354 is positioned nearer to the body 12 with respect to the second end of the first link 350 and is rotatably supported by the second end of the first link 350 with the aid of a rod member 362 extending in the widthwise direction. A second end of the second link 354 is rotatably supported by the base part 38 of the holding portion 14 with the aid of a rod member 364 extending in the widthwise direction. Specifically, the second link 354 is provided across the bottom plate 30A of the body 12 from the holding portion 14. The rod member 364 passes through the oblong hole 312, with one end thereof connected to the holding portion 14 and the other end thereof connected to the second link 354. The rod member 364 is movable in the oblong hole 312 in the front-rear direction.

Referring to FIG. 26, when the holding portion 14 is at the second position, the rod member 364 is positioned at an end of the oblong hole 312 that is on the first side in the front-rear direction. In this state, referring to FIG. 29, the second link 354 is rested on the rib 350A of the first link 350, that is, the second link 354 is in contact with the rib 350A in the top-bottom direction. Specifically, the second link 354 and the rib 350A are in contact with each other on the first side in the front-rear direction with respect to the rod member 362. Hence, the second link 354 is prevented from rotating, relative to the first link 350, about the rod member 362 in a direction in which the rod member 362 moves upward relative to the second link 354.

Referring to FIG. 26, when the holding portion 14 is at the second position, the rod member 364, the rod member 362, and the rod member 360 are positioned in that order in the front-rear direction from the first side of the front-rear direction.

Furthermore, referring to FIG. 26, when the holding portion 14 is at the second position and the attaching tool 310 is seen in the widthwise direction, the rod member 362 is positioned on the upper side with respect to a line connecting the center of the rod member 360 and the center of the rod member 364.

The rod member 362 is provided with a torsion spring 352 as an exemplary force-applying portion.

Torsion Spring

Referring to FIGS. 24 and 26, the torsion spring 352 is provided around the rod member 362 and between the first link 350 and the second link 354. One end of the torsion spring 352 is hooked on the first link 350. The other end of the torsion spring 352 is hooked on the second link 354.

Figure 29:
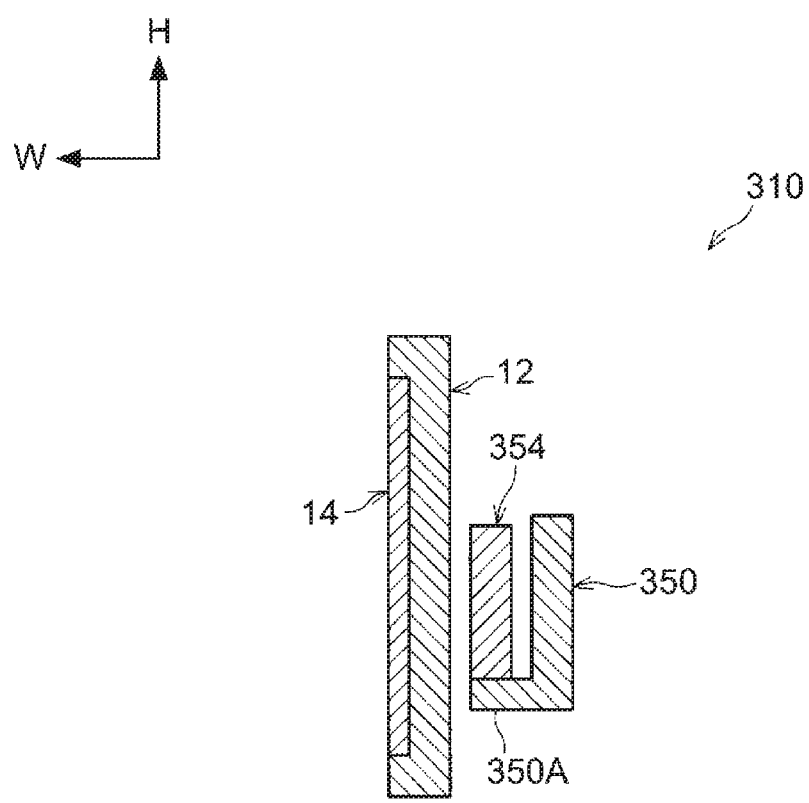
FIG. 29 is a cross-sectional view of the retaining-ring-attaching tool according to the third exemplary embodiment of the present invention.

In the above configuration, the torsion spring 352 applies an external force (an elastic force) to the first link 350 and to the second link 354 such that the second link 354 comes into contact with the rib 350A of the first link 350 in the top-bottom direction (see FIG. 29). With the second link 354 and the rib 350A of the first link 350 being in contact with each other in the top-bottom direction, the holding portion 14 is retained at the second position, as described above.

Functions

Functions of the attaching tool 310 will now be described by describing a method of manufacturing a shaft by using the attaching tool 310 (a shaft-manufacturing method).

Referring to FIGS. 24 and 26, when the attaching tool 310 is not operated, the torsion spring 352 keeps applying an external force to the first link 350 and to the second link 354 such that the second link 354 and the rib 350A of the first link 350 are kept in contact with each other in the top-bottom direction.

Figure 28A:
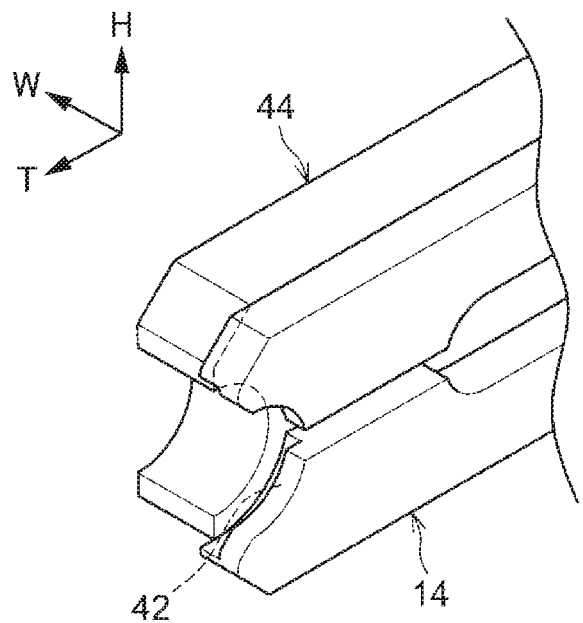
FIGS. 28A and 28B are perspective views of a tip of the retaining-ring-attaching tool according to the third exemplary embodiment of the present invention.

In this state, no retaining ring 100 is held in the notch 42 of the holding portion 14 (see FIG. 28A).

Referring to FIG. 24, the worker first pulls the operation portion 350B of the first link 350 toward the second side in the front-rear direction with the finger F of the hand P holding the attaching tool 310, whereby, referring to FIGS. 26 and 27, the first link 350 rotates about the rod member 360 in a direction R22 indicated in FIG. 26. With the rotation of the first link 350, the second link 354 rotates about the rod member 362 in a direction R24 indicated in FIG. 26 and about the rod member 364 in a direction R26 indicated in FIG. 26.

Then, the holding portion 14 moves toward the second side in the front-rear direction, and the end of the holding portion 14 comes into contact with the wall at the end of the groove 30. Therefore, the holding portion 14 stops moving, and the first link 350 and the second link 354 stop rotating.

In this state, the holding portion 14 is at the first position. Furthermore, the notch 42 of the holding portion 14 faces, in the widthwise direction, the stack of retaining rings 100 supported by the feeding portion 18, and the feeding portion 18 feeds one of the retaining rings 100 that is nearest to the holding portion 14 to the notch 42 with the elastic force exerted by the spring 78.

Subsequently, the worker removes the force having been applied, with the finger F, to the operation portion 350B of the first link 350 from the operation portion 350B. Accordingly, the first link 350 and the second link 354 rotate with the elastic force exerted by the torsion spring 352, the holding portion 14 moves toward the first side in the front-rear direction, and the attaching tool 310 falls into the unoperated state again, as illustrated in FIGS. 24 and 26.

Figure 28B:
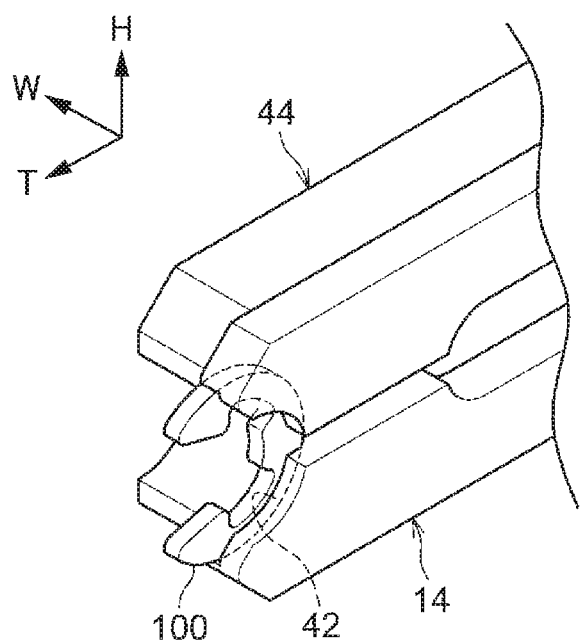

In this state, the holding portion 14 is at the second position. The notch 42 of the holding portion 14 that is at the second position holds the above retaining ring 100 as illustrated in FIG. 28B. That is, since the attaching tool 310 includes the link mechanism 316 that allows the finger F of the hand P holding the body 12 to move the holding portion 14, the retaining ring 100 is attachable to a shaft member (not illustrated) with a movement of the finger F.

Subsequently, the worker moves the attaching tool 310 in the front-rear direction and causes the retaining ring 100 to be fitted into the groove of the shaft member.

Thus, the use of the attaching tool 310 makes it possible to attach the retaining ring 100 to the shaft member with one hand.

The above specific exemplary embodiments of the present invention do not limit the present invention thereto. It is obvious to those skilled in the art that various other embodiments are also acceptable within the scope of the present invention. For example, while the first exemplary embodiment employs the torsion spring 52, the torsion spring 52 may be omitted. If the torsion spring 52 is omitted, the worker may move the holding portion 14 between the first position and the second position by pushing and pulling the third link 58.

Furthermore, while the above exemplary embodiments each employ the link mechanism 16 including three or two links, the link mechanism may alternatively include one link or four or more links.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A retaining-ring-attaching tool comprising:
    a holding portion having a notch configured to hold a retaining ring, the retaining ring being separate from the retaining-ring-attaching tool;
    a body supporting the holding portion such that the holding portion is movable in one direction;
    a link mechanism including an operation portion supported by the body, the operation portion being operable with a finger of a hand holding the body, the link mechanism being configured to move, when the operation portion is operated, the holding portion between a first position and a second position, such that, in a case in which the retaining ring is held in the notch, the retaining ring is ready to be attached to a shaft member when the holding portion is at the second position, the link mechanism further including a force-applying portion configured to apply an external force to the holding portion such that the holding portion moves to the second position; and
    a feeding portion supported by the body and configured to, when the holding portion is moved to the first position, feed the retaining ring to the notch.

2. A shaft-manufacturing method in which a shaft including a shaft member and a retaining ring attached to the shaft member is manufactured with the retaining-ring-attaching tool according to claim 1, the method comprising:
    feeding the retaining ring to the notch from the feeding portion by operating the operation portion of the link mechanism such that the holding portion at the second position moves to the first position;
    moving the holding portion at the first position to the second position with the external force applied from the force-applying portion when a force used in operating the operation portion of the link mechanism is removed from the operation portion; and
    attaching the retaining ring held in the notch of the holding portion at the second position to the shaft member.

3. A retaining-ring-attaching tool comprising:
    a holding portion having a notch configured to hold a retaining ring, the retaining ring being separate from the retaining-ring-attaching tool;
    a body supporting the holding portion such that the holding portion is movable in one direction;
    a link mechanism including a trigger supported by the body, the trigger being operable with a finger of a hand holding the body, the link mechanism being configured to move, when the trigger is operated, the holding portion between a first position and a second position, such that, in a case in which the retaining ring is held in the notch, the retaining ring is ready to be attached to a shaft member when the holding portion is at the second position, the link mechanism further including a spring configured to apply an external force to the holding portion such that the holding portion moves to the second position; and a rail, a block and a spring supported by the body and configured to, when the holding portion is moved to the first position, feed the retaining ring to the notch.

\* \* \* \* \*